United States Patent
Hyde et al.

(10) Patent No.: US 9,246,314 B2
(45) Date of Patent: Jan. 26, 2016

(54) MOBILE DEVICE CONFIGURED TO PERFORM TASKS RELATED TO A POWER TRANSMISSION SYSTEM

(75) Inventors: Roderick A. Hyde, Redmond, WA (US); Lowell L. Wood, Jr., Bellevue, WA (US)

(73) Assignee: Elwha LLC

( * ) Notice: Subject to any disclaimer, the term of this patent is extended or adjusted under 35 U.S.C. 154(b) by 965 days.

(21) Appl. No.: 13/436,404

(22) Filed: Mar. 30, 2012

(65) Prior Publication Data
US 2013/0261797 A1    Oct. 3, 2013

Related U.S. Application Data

(63) Continuation-in-part of application No. 13/436,299, filed on Mar. 30, 2012, and a continuation-in-part of application No. 13/436,462, filed on Mar. 30, 2012, and a continuation-in-part of application No. 13/436,520, filed on Mar. 30, 2012.

(51) Int. Cl.
*H02G 1/02* (2006.01)
*G06K 9/00* (2006.01)
*G01R 31/02* (2006.01)

(52) U.S. Cl.
CPC .............. *H02G 1/02* (2013.01); *G06K 9/00664* (2013.01); *G01R 31/02* (2013.01); *Y10T 29/532* (2015.01)

(58) Field of Classification Search
CPC ............ H02G 1/02; H02G 1/06; H02G 7/00; H02G 7/16; H02G 7/18; H02G 9/00–9/10; G06K 9/00664; Y10S 901/01; Y10S 901/41; Y10S 901/46–901/47; G01R 31/02; G01R 31/003; G01R 31/08–31/085; B25J 13/08–13/081; B25J 13/084–13/087; B25J 11/005–11/006; B25J 19/02–19/04; B61B 7/00; Y10T 29/532
See application file for complete search history.

(56) References Cited

U.S. PATENT DOCUMENTS

3,162,992 A    12/1964   Davis et al.
3,174,725 A    3/1965    Pfundt
(Continued)

FOREIGN PATENT DOCUMENTS

DE    197 29 554 A1    1/1999
EP    0 377 939 B1    5/1996
(Continued)

OTHER PUBLICATIONS highvoltage.pdf (safespaceprotection, EMF Pollution from Living Near Power Lines, http://www.safespaceprotection.com/electrostress-from-power-lines.aspx, Archived on wayback machine http://web.archive.org/web/20110602002818/http://www.safespaceprotection.com/electrostress-from-power-lines.aspx Jun. 2, 2011 and copyright 2010, pp. 1-6).*

(Continued)

*Primary Examiner* — Bao Long T Nguyen

(57) ABSTRACT

Described embodiments include a system and an apparatus. A described mobile robotic device includes a mobile chassis configured to travel on a transmission line of a power transmission system. The mobile robotic device includes an inspection module physically associated with the mobile chassis and configured to automatically inspect a structure associated with the power transmission system. The mobile robotic device includes a risk-assessment module physically associated with the mobile chassis and configured to assess a potential risk to the power transmission system in response to inspection data provided by the inspection module. The mobile robotic device includes a communication module physically associated with the mobile chassis and configured to output data indicative of the assessed potential risk.

30 Claims, 17 Drawing Sheets

(56) References Cited

U.S. PATENT DOCUMENTS

| | | | |
|---|---|---|---|
| 3,259,370 | A | 7/1966 | Neale, Sr. |
| 3,289,983 | A | 12/1966 | Mennerdahl |
| 3,541,487 | A | 11/1970 | Leonard |
| 4,019,715 | A | 4/1977 | Vugrek |
| 4,626,387 | A | 12/1986 | Dodds |
| 4,715,582 | A | 12/1987 | Ikeda et al. |
| 4,818,990 | A | 4/1989 | Fernandes |
| 4,904,996 | A | 2/1990 | Fernandes |
| 5,524,869 | A | 6/1996 | Asplin |
| 5,657,620 | A | 8/1997 | Thagard et al. |
| 6,261,481 | B1 | 7/2001 | Akatsuka et al. |
| 6,408,906 | B1 * | 6/2002 | Moon et al. ............... 144/24.13 |
| 6,494,141 | B2 | 12/2002 | Montambault et al. |
| 7,282,944 | B2 | 10/2007 | Gunn et al. |
| 7,496,459 | B2 | 2/2009 | McAllister et al. |
| 8,275,570 | B2 | 9/2012 | Rousselle |
| 2001/0015149 | A1 | 8/2001 | Montambault et al. |
| 2002/0038199 | A1 | 3/2002 | Blemel |
| 2004/0189317 | A1 | 9/2004 | Borchert et al. |
| 2005/0017751 | A1 | 1/2005 | Gunn et al. |
| 2005/0133244 | A1 | 6/2005 | Devine et al. |
| 2006/0201468 | A1 | 9/2006 | Lancaster et al. |
| 2007/0009215 | A1 | 1/2007 | Sales Casals |
| 2008/0246010 | A1 | 10/2008 | Barthold |
| 2008/0246507 | A1 | 10/2008 | Gunn et al. |
| 2008/0249723 | A1 | 10/2008 | McAllister et al. |
| 2008/0288321 | A1 | 11/2008 | Dillon et al. |
| 2009/0015239 | A1 | 1/2009 | Georgiou et al. |
| 2009/0019689 | A1 | 1/2009 | Zobel et al. |
| 2009/0250449 | A1 | 10/2009 | Petrenko et al. |
| 2009/0265193 | A1 * | 10/2009 | Collins et al. ..................... 705/4 |
| 2009/0322205 | A1 | 12/2009 | Lowery |
| 2010/0018672 | A1 | 1/2010 | Yang |
| 2010/0087322 | A1 | 4/2010 | Yuan et al. |
| 2010/0100239 | A1 | 4/2010 | Park et al. |
| 2010/0193175 | A1 | 8/2010 | Gilliland et al. |
| 2010/0230087 | A1 | 9/2010 | Ouyang |
| 2010/0231056 | A1 | 9/2010 | Varley et al. |
| 2010/0262393 | A1 | 10/2010 | Sharma et al. |
| 2011/0011621 | A1 | 1/2011 | Hyde et al. |
| 2011/0035052 | A1 | 2/2011 | McLurkin et al. |
| 2011/0110108 | A1 | 5/2011 | Calon et al. |
| 2011/0110396 | A1 | 5/2011 | Grayson et al. |
| 2011/0192315 | A1 | 8/2011 | Phillips et al. |
| 2011/0196535 | A1 | 8/2011 | Phillips et al. |
| 2012/0019622 | A1 * | 1/2012 | Rousselle et al. ............... 348/46 |
| 2012/0271501 | A1 * | 10/2012 | Zhao et al. ...................... 701/25 |
| 2012/0306510 | A1 * | 12/2012 | White et al. ................... 324/551 |

FOREIGN PATENT DOCUMENTS

| | | |
|---|---|---|
| WO | WO 2011/032127 A2 | 3/2011 |
| WO | WO 2011/081274 A1 | 7/2011 |
| WO | WO 2012/039767 A1 | 3/2012 |

OTHER PUBLICATIONS

PCT International Search Report; International App. No. PCT/US13/34037; Jun. 10, 2013; pp. 1-2.

PCT International Search Report; International App. No. PCT/US13/34022; Jun. 10, 2013; pp. 1-2.

PCT International Search Report; International App. No. PCT/US2013/037536; Aug. 2, 2013; pp. 1-2.

PCT International Search Report; International App. No. PCT/US2013/037538; Aug. 1, 2013; pp. 1-2.

PCT International Search Report; International App. No. PCT/US 13/34030; Jun. 19, 2013; pp. 1-3.

Hongguang et al; "Research of Power Transmission Line Maintenance Robots in SIACAS"; 2010 1$^{st}$ International Conference on Applied Robotics for the Power Industry, Delta Centre-Ville, Montréal, Canada; bearing a date of 2010, Conference Dates Oct. 5-7, 2010; pp. 1-7; IEEE.

PCT International Search Report; International App. No. PCT/US2013/034014; Jul. 8, 2013; pp. 1-2.

Beltran San Segundo et al.; "Automated Inspection of Electric Transmission Lines: The power supply system"; bearing a date of 2006, printed on Feb. 29, 2012; pp. 3788-3792; IEEE.

"Cable Crawler"; YouTube; bearing a date of Feb. 26, 2008, printed on Feb. 24, 2012; pp. 1-3; located at: http://www.youtube.com/watch?v=T4tIcIkAfRU.

De Souza et al.; "Inspection Robot for High-Voltage Transmission Lines"; printed on Feb. 29, 2012; pp. 1-7.

Jiang et al.; "Mobile Monitoring and Maintenance of Power Systems"; printed on Feb. 29, 2012; pp. 1-6.

Li et al.; "Development of An Inspection Robot Control System for 500KV Extra-High Voltage Power Transmission Lines"; SICE Annual Conference in Sapporo; bearing dates of Aug. 4-6, 2004 and 2004; pp. 1819-1824; SICE.

Mika, Eric; "Robot cable crawler detects underground damage"; CNNTech; bearing a date of May 16, 2007, printed on Feb. 24, 2012; pp. 1-2.

Montambault et al.; "Design and Validation of a Mobile Robot for Power Line Inspection and Maintenance"; 6$^{th}$ International Conference on Field and Service Robotics—FSR 2007, Chamonix, France; bearing dates of Dec. 7, 2007 and 2007, printed on Feb. 29, 2012; pp. 1-10.

Pouliot et al.; "Geometric Design of the LineScout, a Teleoperated Robot for Power Line Inspection and Maintenance"; 2008 IEEE International Conference on Robotics and Automation; bearing dates of May 19-23, 2008 and 2008; pp. 3970-3977; IEEE.

"Robotic Crawler Detects Wear in Power Lines"; Transmission & Distribution World; bearing a date of Jan. 1, 2007, printed on Feb. 24, 2012; p. 1; located at: http://tdworld.com/test_monitor_control/top_story/robotic-crawler-tester/.

Solon, Olivia; "Robot operates on live transmission lines"; Wired UK; bearing a date of Aug. 24, 2010, printed on Mar. 19, 2012; pp. 1-9; located at: http://www.wired.co.uk/news/archive/2010-08/24/robot-operates-on-live-transmission-lines.

Tingyu et al.; "Development of a Dual-Arm Mobile Robot for High Voltage Power Lines"; Proceedings of the 2007 IEEE International Conference on Robotics and Biomimetics; bearing dates of Dec. 15-18, 2007 and 2008; pp. 1924-1929; IEEE.

Wang et al.; "Research on a new crawler type inspection robot for power transmission lines" (Abstract only); IEEE Xplore; bearing dates of Oct. 5-7, 2010, Nov. 9, 2010, and 2012, printed on Feb. 24, 2012; p. 1; IEEE; located at: http://ieeexplore.ieee.org/xpl/freeabs_all.jsp?reload=true&arnumber=5624471.

Xiao et al.; "An Inspection Robot for High Voltage Power Transmission Line and Its Dynamics Study"; Service Robot Applications; printed on Feb. 29, 2012; pp. 331-342.

* cited by examiner

610 Computer-readable media.

620 Program instructions which, when executed by a processor of a computing device, cause the computing device to perform a process including:

(a) program instructions which, when executed by a processor of a computing device, cause the computing device to perform a process including:

(i) receiving data indicative of at least one physical parameter of a high voltage power transmission system configured to transport electric power from one place to another;

(ii) assessing a potential operational risk to a portion of the high voltage power transmission system at least partially based on the received data; and (iv) scheduling a traverse by a mobile device over a live transmission line based upon the assessed potential operational risk, the live transmission line and providing access to the portion of the high voltage power transmission system, the mobile device configured to traverse live transmission lines and perform an action on the high voltage power transmission system in response to the assessed potential operational risk; and 622 Providing a notification at least partially based on the data to at least one of a human, computer, or system.

624 Transforming the data indicative of the scheduled traverse into a particular visual depiction, and outputting the particular visual depiction.

626 Outputting data indicative of the scheduled traverse of the live transmission line by the mobile device.

612 The computer-readable media includes a tangible computer-readable media.

614 The computer-readable media includes a communications media.

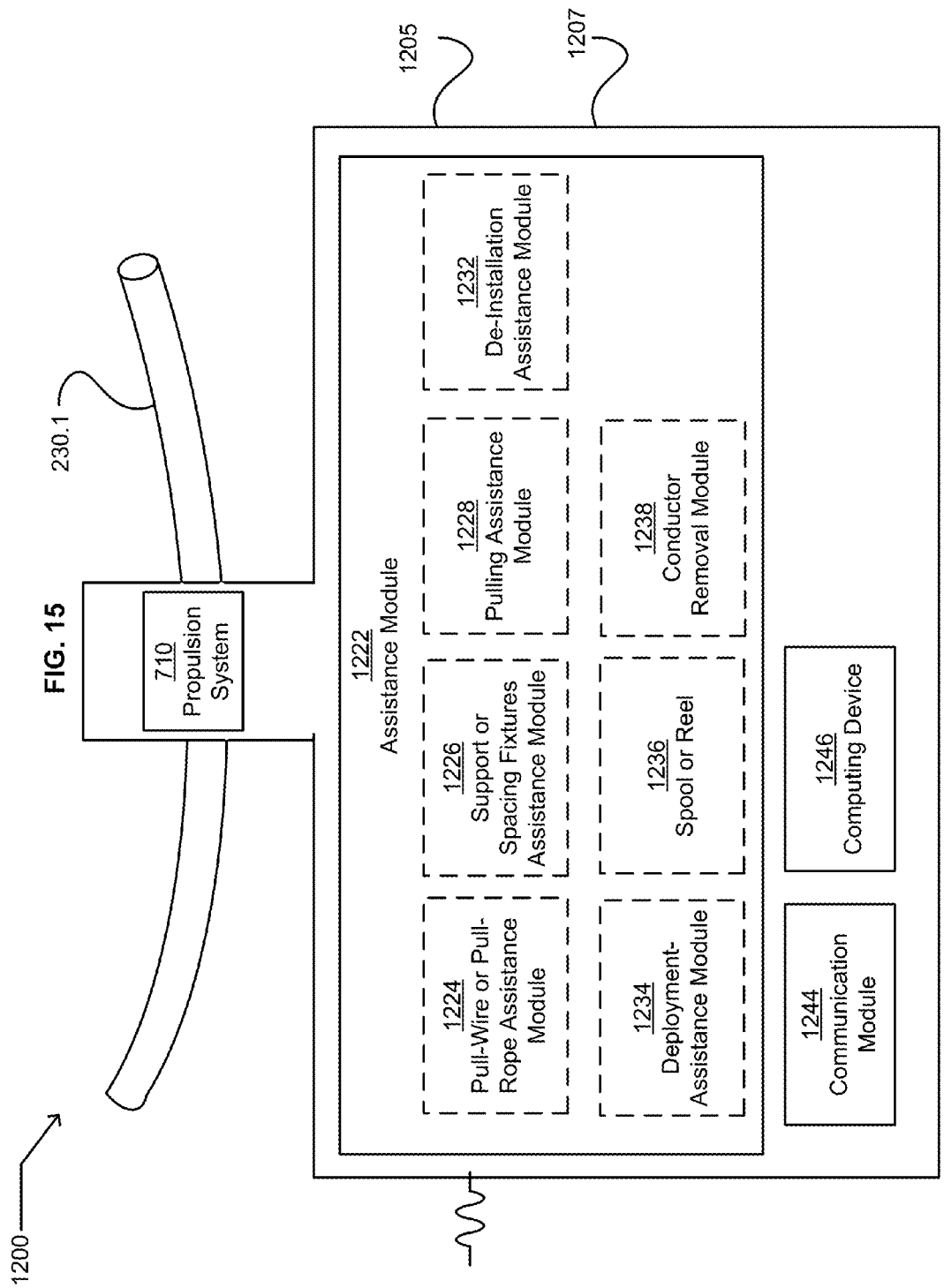

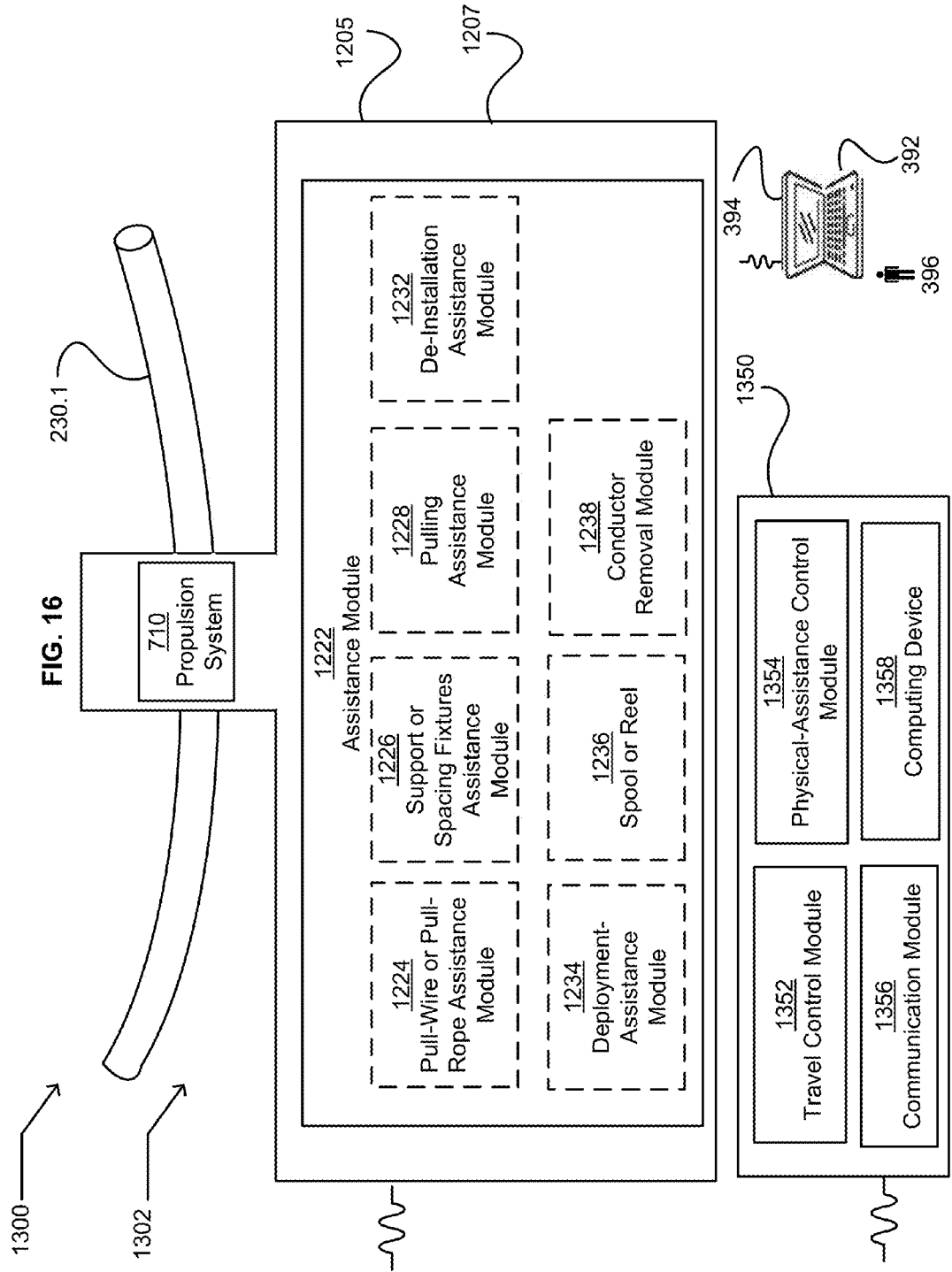

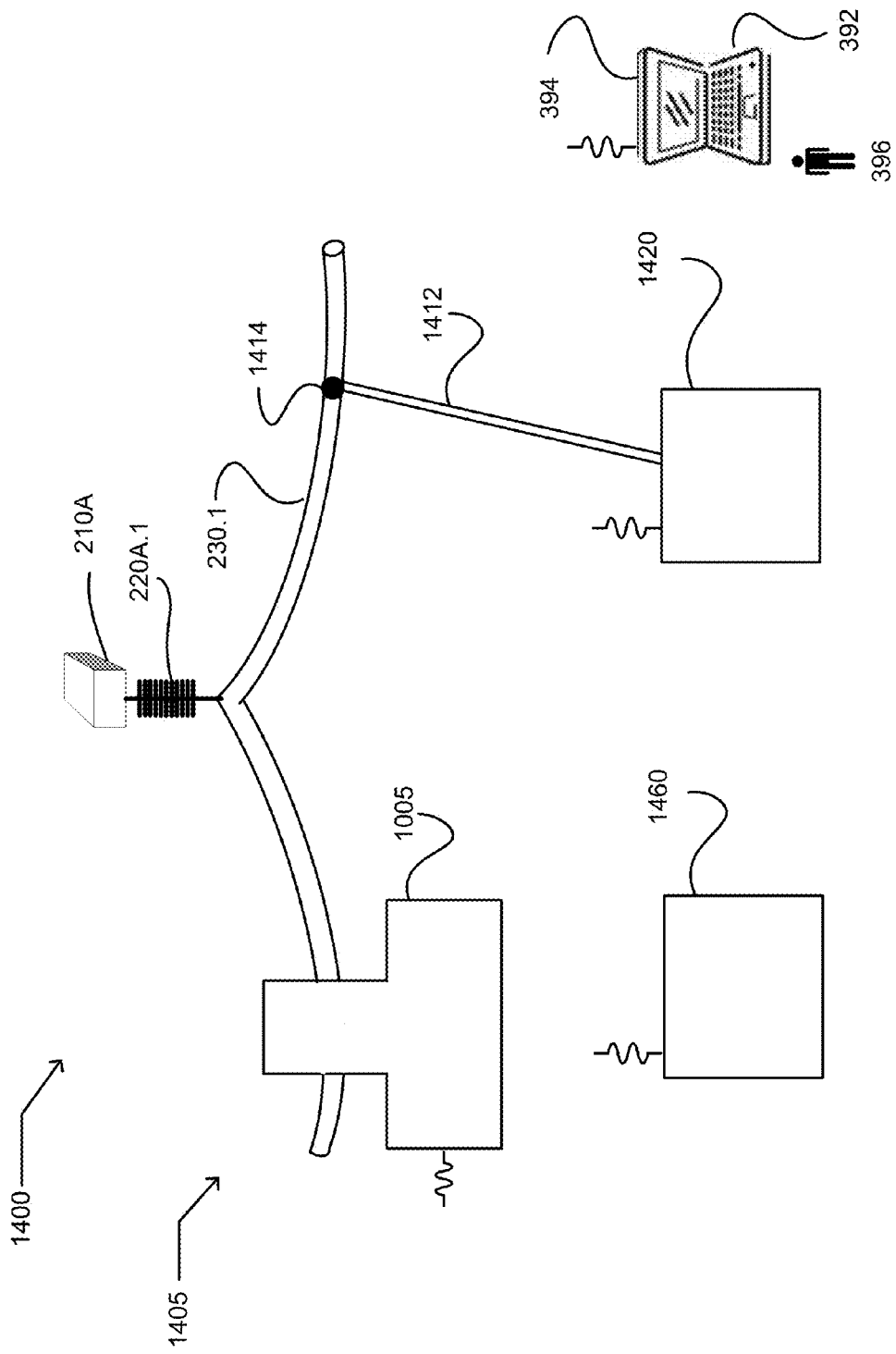

MOBILE DEVICE CONFIGURED TO PERFORM TASKS RELATED TO A POWER TRANSMISSION SYSTEM

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 13/436,299, entitled APPARATUS AND SYSTEM FOR SCHEDULING MOBILE DEVICE OPERATIONS ON A POWER TRANSMISSION SYSTEM, naming Roderick A. Hyde, and Lowell L. Wood, Jr., as inventors, filed Mar. 30, 2012, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/436,462, entitled DEVICES CONFIGURED TO COOPERATIVELY MEASURE PROPERTIES OF A POWER TRANSMISSION SYSTEM, naming Roderick A. Hyde, and Lowell L. Wood, Jr., as inventors, filed Mar. 30, 2012, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/436,520, entitled MOBILE DEVICE CONFIGURED TO TRAVEL ON A TRANSMISSION LINE AND PROVIDE ASSISTANCE, naming Roderick A. Hyde, and Lowell L. Wood, Jr., as inventors, filed Mar. 30, 2012, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

For example, and without limitation, an embodiment of the subject matter described herein includes a mobile robotic device. In this embodiment, the mobile robotic device includes a mobile chassis configured to travel on a transmission line of a power transmission system. The mobile robotic device includes an inspection module physically associated with the mobile chassis and configured to automatically inspect a structure associated with the power transmission system. The mobile robotic device includes a risk-assessment module physically associated with the mobile chassis and configured to assess a potential risk to the power transmission system in response to inspection data provided by the inspection module. The mobile robotic device includes a communication module physically associated with the mobile chassis and configured to output data indicative of the assessed potential risk. In an embodiment, the mobile device includes a maintenance module physically associated with the mobile chassis and configured to perform a maintenance, repair, or modification activity relative to the power transmission system in response to the assessed potential risk.

For example, and without limitation, an embodiment of the subject matter described herein includes a system. In this embodiment, the system includes a mobile robotic device configured to travel on a transmission line of an power transmission system and to automatically inspect a structure associated with the power transmission system. The system includes a transmission system management tool configured to assess a potential risk to the power transmission system in response to inspection data provided by the mobile device. The transmission system management tool is further configured to accordingly to initiate a maintenance, repair, or modification activity relative to the structure of the power transmission system by the mobile robotic device or another mobile robotic device.

For example, and without limitation, an embodiment of the subject matter described herein includes a mobile robotic device. In this embodiment, the mobile robotic device includes a mobile chassis configured to travel on a transmission line of an overhead power transmission system. The mobile robotic device includes a vegetation inspection module physically associated with the mobile chassis and configured to measure a characteristic of vegetation growing proximate to a portion of the overhead power transmission system. The mobile robotic device includes a communication module physically associated with the mobile chassis and configured to output data indicative of the measured characteristic of the vegetation. In an embodiment, the mobile robotic device includes a maintenance module physically associated with the mobile chassis and configured to trim vegetation growing proximate to a portion of the overhead power transmission system.

For example, and without limitation, an embodiment of the subject matter described herein includes a system. In this embodiment, the system includes a mobile device configured to travel on or along a transmission line of a power transmission system and measure one or more characteristics of vegetation encroaching the power transmission system. The system includes a vegetation management tool configured to address the measured one or more characteristics and assess risk to the power transmission system posed by the encroaching vegetation.

BRIEF DESCRIPTION OF THE DRAWINGS

FIG. 9 illustrates a computer program product 600 in which embodiments may be implemented;

FIG. 15 illustrates an example environment 1200 in which embodiments may be implemented;

FIG. 16 illustrates an example environment 1300 in which embodiments may be implemented; and;

FIG. 17 illustrates an example environment 1400 in which embodiments may be implemented;

DETAILED DESCRIPTION

Figure 1:
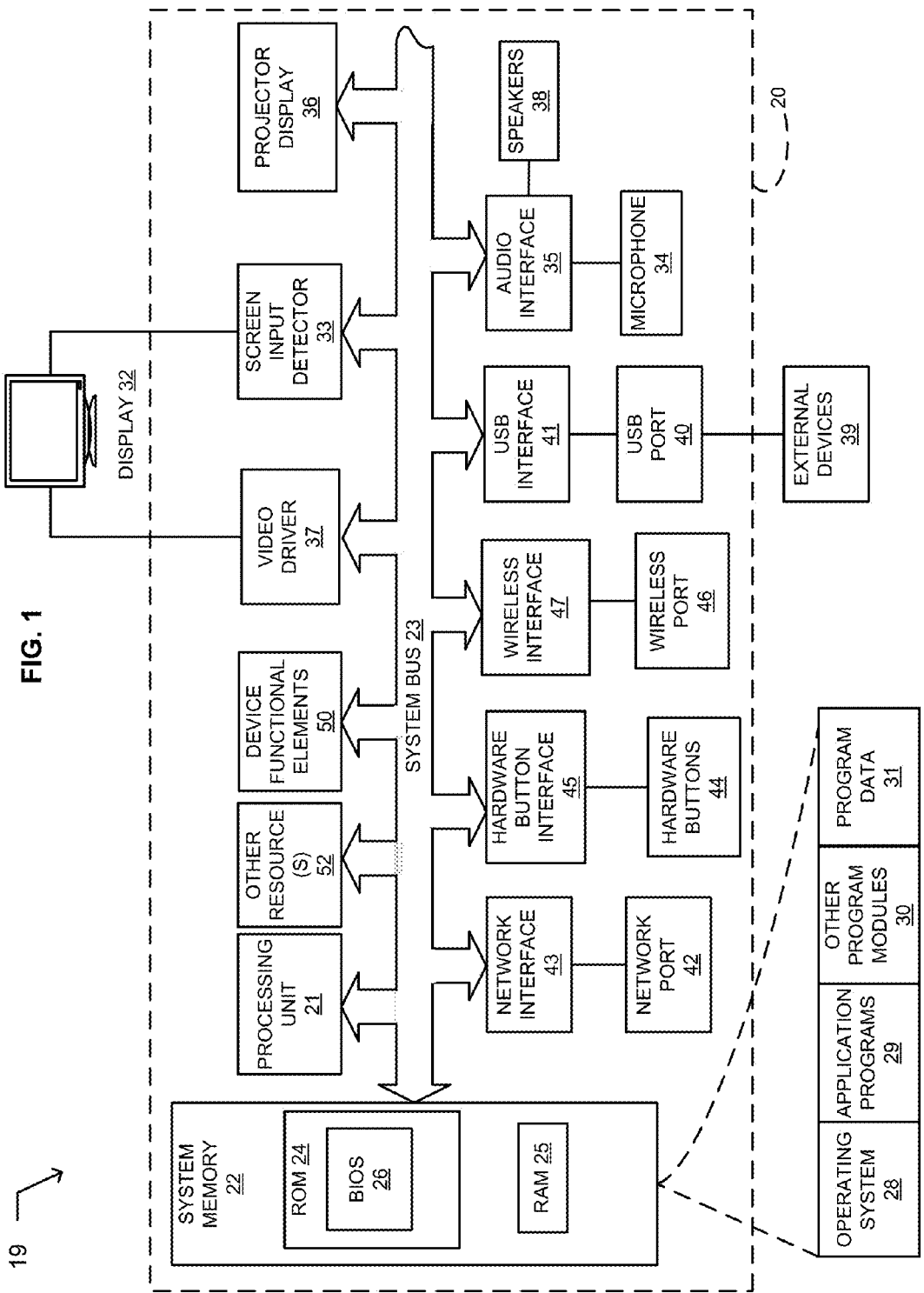
FIG. 1 illustrates an example embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 2:
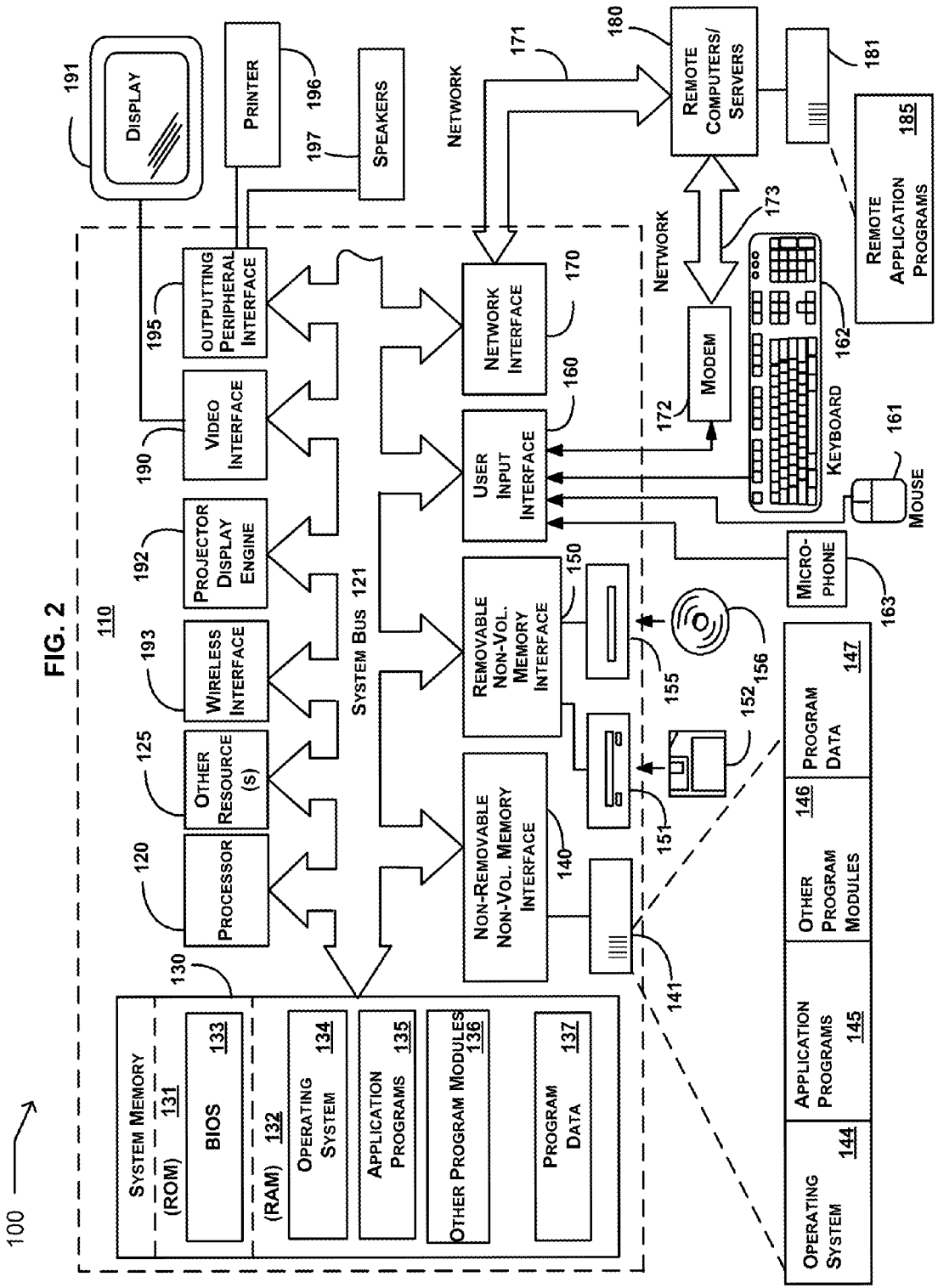
FIG. 2 illustrates an example embodiment of a general-purpose computing system in which embodiments may be implemented.

FIGS. 1 and 2 provide respective general descriptions of several environments in which implementations may be implemented. FIG. 1 is generally directed toward a thin computing environment 19 having a thin computing device 20, and FIG. 2 is generally directed toward a general purpose computing environment 100 having general purpose computing device 110. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 19 in which embodiments may be implemented. FIG. 1 illustrates an example system that includes a thin computing device 20, which may be included or embedded in an electronic device that also includes a device functional element 50. For example, the electronic device may include any item having electrical or electronic components playing a role in a functionality of the item, such as for example, a refrigerator, a car, a digital image acquisition device, a camera, a cable modem, a printer an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, a smart phone (such as an Android® or iPhone® based device), a tablet device (such as an iPad®) or a Blackberry® device. For example, a thin computing device may include a thin client device or a mobile thin client device, such as a smart phone, tablet, notebook, or desktop hardware configured to function in a virtualized environment.

The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 or RAM 25, including an operating system 28, one or more application programs 29, other program modules 30 and program data 31.

A user may enter commands and information into the computing device 20 through one or more input interfaces. An input interface may include a touch-sensitive display, or one or more switches or buttons with suitable input detection circuitry. A touch-sensitive display is illustrated as a display 32 and screen input detector 33. One or more switches or buttons are illustrated as hardware buttons 44 connected to the system via a hardware button interface 45. The output circuitry of the touch-sensitive display 32 is connected to the system bus 23 via a video driver 37. Other input devices may include a microphone 34 connected through a suitable audio interface 35, or a physical hardware keyboard (not shown). Output devices may include the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are examples and other components and means of establishing communication links may be used.

The computing device 20 may be primarily designed to include a user interface. The user interface may include a character, a key-based, or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 20 may be deemed not necessary and omitted. In other instances, one or more other elements may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 100. Components of the computing system environment 100 may include, but are not limited to, a general purpose computing device 110 having a processor 120, a system memory 130, and a system bus 121 that couples various system components including the system memory to the processor 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media. By way of further example, and not of limitation, computer-readable media may include a communication media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media.

Communication media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media may include wired media, such as a wired network and a direct-wired connection, and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by the processor 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS"® are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, or is coupled to an optical disk drive 155 that reads from and writes to a removable, non-volatile optical disk 156, such as a CD ROM. Other removable/non-removable, volatile/non-volatile computer storage media that can be used in the example operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch sensitive display, joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, or the wireless interface 193. The network may include a LAN network environment, or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on memory storage device 181. It will be appreciated that the network connections shown are examples and other means of establishing communication link between the computers may be used.

In certain instances, one or more elements of the computing device 110 may be deemed not necessary and omitted. In other instances, one or more other elements may be deemed necessary and added to the computing device.

Figure 3:
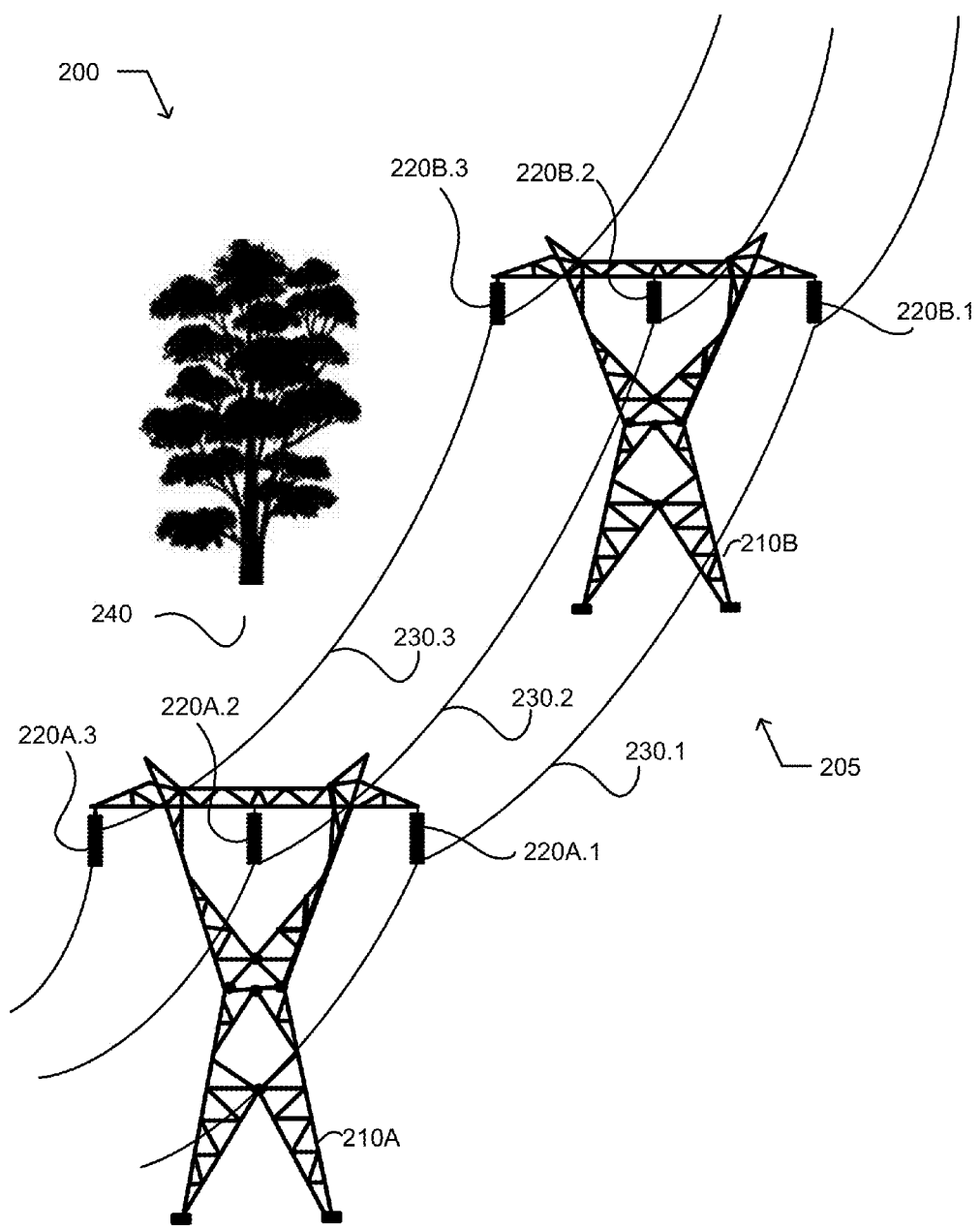
FIG. 3 illustrates an example environment 200 in which embodiments may be implemented.

FIG. 3 illustrates an example environment 200 in which embodiments may be implemented. The environment includes high-voltagehigh-voltage power transmission system configured to transport electric power from one place to another. FIG. 3 illustrates an example of the high-voltagehigh-voltage power transmission system as an overhead high-voltagehigh-voltage power transmission system 205. In another example, the high-voltagehigh-voltage power transmission system may be an underground high-voltagehigh-voltage power transmission system.

In an embodiment, a high-voltage power transmission system may include a power transmission system designed and insulated to transport electric power from one place to another at voltage over approximately 35,000 volts. For example, voltages of high-voltage power transmission may include 138 kV, 230 kV, 345 kV, 500 kV, or 765 kV. In an embodiment, a power distribution system may include a system designed and insulated to transport and distribute electrical power from a high-voltage power transmission system to a subtransmission customer. For example, voltages of a power distribution system may include 26 kV or 69 kv, to a primary customer at 13 kV or 4 kV, or to a secondary customer at 120V or 240V.

Structures associated with the example system 205 includes transmission towers 210 supporting transmission lines 230 that are suspended from insulators 220. FIG. 3 illustrates example transmission towers as towers 210A and 210B. Example insulators 220 are illustrated as insulators 220A.1, 220A.2, and 220A.3 mounted on the tower 210A and insulators 220B.1, 220B.2, and 220B.3 mounted on the tower 210B. The insulators may be made, for example, from wet-process porcelain, toughened glass, glass-reinforced polymer composites or other non-ceramic materials. Example transmission lines 230 are illustrated as transmission lines 230.1, 230.2, and 230.3. High-voltage power transmission systems are subject to operational risks, such as for example, weather conditions, ambient temperatures, lightning, or precipitation affect an overhead high-voltage power transmission system. Other operational risks may include for example age, damage, or deterioration. Other operational risks may include for example vegetation, or human originated encroachments. A potential operational risk is illustrated in FIG. 3 as vegetation 240.

Figure 4:
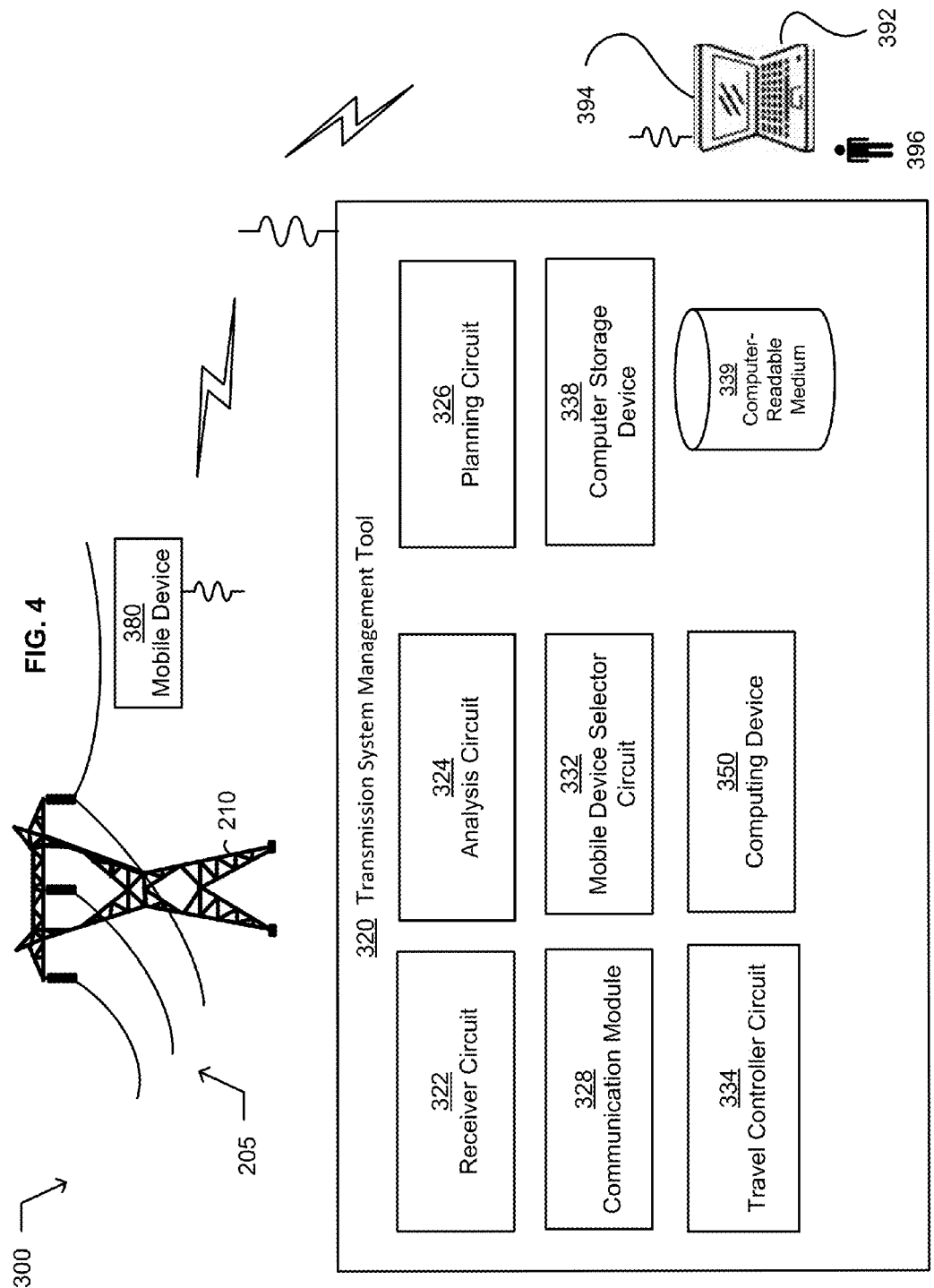
FIG. 4 illustrates an example environment 300 in which embodiments may be implemented.

FIG. 4 illustrates an example environment 300. The environment includes an apparatus, illustrated by transmission system management tool 320 (hereafter 'TSM tool"). The environment includes the high-voltage power transmission system 205 described in conjunction with FIG. 3, and is illustrated by the tower 210. The environment includes a mobile device 380 configured to traverse transmission lines and perform an action in response to assessed potential operational risks of the high-voltage power transmission system.

The TSM tool 320 includes a receiver circuit 322, an analysis circuit 324, and a planning circuit 326. The receiver circuit includes a receiver circuit configured to receive data indicative of at least one physical parameter of a power transmission system, illustrated as the high-voltage power transmission system 205, configured to transport electric power from one place to another. The analysis circuit includes an analysis circuit configured to assess a potential operational risk to a portion of the power transmission system at least partially based on the received data. For example, the portion of the power transmission system may include that portion of the high-voltage power transmission system between towers 210A and 210B. For example, the portion of the power transmission system may include that portion of the transmission line 230.1 between towers 210A and 210B. For example, the portion of the power transmission system may include that portion of the high-voltage power transmission system between towers 210A and another tower. The planning circuit includes a planning circuit configured to schedule a traverse by the mobile device 380 of a transmission line of the power transmission system at least partially based upon the assessed potential operational risk. The transmission line provides access to the portion of the power transmission system.

Those skilled in the art will recognize that in an embodiment aspects of the TSM tool 320 can be implemented using a hardware, software, and/or firmware implementation. Those skilled in the art will recognize that in an embodiment aspects of the TSM tool can be implemented, individually and/or collectively, by various types of electro-mechanical systems having a wide range of electrical components such as hardware, software, firmware, and/or virtually any combination thereof. Those skilled in the art will recognize that in an embodiment aspects of the TSM tool can be implemented using a general purpose computer programmed to carry out or perform one or more particular functions of the TSM tool. For example, aspects of the TSM tool can be implemented using a computing device 350. In an embodiment, the computing device may be coupled with a computer storage device 338 coupled to a computer-readable medium. In an embodiment, the computing device may be implemented in part or whole using the general purpose thin computing device 20 described in conjunction with FIG. 1. In an embodiment, the computing device may be implemented in part or whole using the purpose computing device 100 described in conjunction with FIG. 2.

In an embodiment, the power transmission system includes a high-voltage power transmission system. In an embodiment, the power transmission system includes a power distribution system.

In an embodiment, the data indicative of at least one physical parameter of the high-voltage power transmission system 205 includes at least one of an operating voltage, current, phase, configuration, age, or capacity parameter of a component of the high-voltage power transmission system. For example, a component may include an insulator, and the parameter may be the type, manufacturer, failure rate, age, years in service, or last cleaning of the insulator. For example, a component may include circuit breakers, switches, or transformers of the high-voltage power transmission system. In an embodiment, wherein the data indicative of at least one physical parameter of a high-voltage power transmission system includes at least one of an current, phase, configuration, age, cable size, cable material or metal composition, or single or bundled conductor status parameter of a transmission line of the high-voltage power transmission system. In an embodiment, the data indicative of data indicative of at least one physical parameter of a high-voltage power transmission system includes at least one of a location or a map of the high-voltage power transmission system. For example, the map may include a geographic or schematic map. For example, the map may include tower locations, tower configurations, or tower heights. For example, the map may include clearances or acceptable line sag at particular locations. In an embodiment, the data indicative of at least one physical parameter of a high-voltage power transmission system includes at least one of safety and/or fault tolerance margins, or peak loads of the high-voltage power transmission system.

In an embodiment, the high-voltage power transmission system 205 includes an overhead high-voltage power transmission system configured to transport electric power from one place to another. In an embodiment, the high-voltage power transmission system includes an underground high-voltage power transmission system configured to transport electric power from one place to another. In an embodiment, the high-voltage power transmission system includes a particular high-voltage power transmission system configured to transport electric power from one place to another. In an embodiment, the high-voltage power transmission system is parsable into at least two high-voltage power transmission system portions for assessment of a potential operational risk.

In an embodiment, the receiver circuit 322 further configured to receive data indicative of an existing condition affecting the high-voltage power transmission system. For example, an existing condition may include an existing weather condition, i.e., wind, snow, or temperature. In an embodiment, the at least one event includes at least one of weather conditions, ambient temperatures, lightning, or precipitation affecting the high-voltage power transmission system. In an embodiment, the at least one event includes at least one of existing line temperatures, current demand, or equipment failures of the high-voltage power transmission system. In an embodiment, the at least one event includes at least one of peak loads values, peak load characteristics, or status of another high-voltage power transmission system affecting the high-voltage power transmission system. In an embodiment, the at least one event includes at least one of seasonal, date, or holiday status affecting the high-voltage power transmission system. In an embodiment, the potential operational risk includes a potential inspection requirement. In an embodiment, the potential operational risk includes a potential maintenance requirement. In an embodiment, the potential operational risk includes a potential repair requirement.

In an embodiment, the analysis circuit 324 includes an analysis circuit configured to assess a potential operational risk to a portion of the high-voltage power transmission system or a structure associated with the portion of the high-voltage power transmission system. The assessment is at least partially based on the received data.

In an embodiment, the transmission line is a live transmission line. In an embodiment, the transmission line is a depowered transmission line.

In an embodiment, the planning circuit 326 includes a planning circuit configured to prioritize a first assessed potential operational risk to a first portion of the portion of the high-voltage power transmission system with respect to a second assessed potential operational risk to second portion of the high-voltage power transmission system. The prioritization is at least partially based upon the first assessed potential operational risk and the second assessed potential operational risk. The planning circuit is also configured to schedule a traverse of the first portion of the portion of the high-voltage power transmission system in response to the prioritization. For example, the prioritizing may based upon a ranking of a plurality of operational risks. For example, a possible catastrophic operational risk would have a higher priority than a routine preventative operational risk. In an embodiment, the planning circuit includes a planning circuit configured to schedule in response to the assessed potential operational risk a traverse over a transmission line providing access to the portion of the high-voltage power transmission system by at least two mobile devices. The at least two mobile devices configured to act in cooperation with each other.

In an embodiment, the transmission line is positioned relative to the portion of the high-voltage power transmission system in a manner that allows inspection access to the portion of the high-voltage power transmission system. In an embodiment, the transmission line is positioned relative to the portion of the high-voltage power transmission system in a manner to allow repair access to the portion of the high-voltage power transmission system. In an embodiment, the transmission line is positioned relative to the portion of the high-voltage power transmission system in a manner that allows maintenance access to the portion of the high-voltage power transmission system. In an embodiment, the transmission line is positioned relative to the portion of the high-voltage power transmission system in a manner that allows replacement access to the portion of the high-voltage power transmission system.

In an embodiment, the data receiver circuit 322 is further configured to receive data indicative of an existing condition affecting the high-voltage power transmission system provided by another mobile device operating on the high-voltage power transmission system. In an embodiment, the data receiver circuit is further configured to receive data indicative of a first available mobile device having a first capability to respond to the assessed potential operational risk and a second available mobile device having a second capability to respond to the assessed potential operational risk. In an embodiment, the TSM tool includes a mobile device selector circuit 332 configured to select an available mobile device to perform the scheduled traverse of the transmission line from among a first available mobile device and a second available mobile device.

In an embodiment, the planning circuit 326 is further configured to provide data indicative of the scheduled traverse of the transmission line by the mobile device. For example, the data may be provided in response to a request or a pull from another circuit of the TSM tool 320 or from a third-party device. For example, the data may be pushed to another circuit of the TSM tool or to a third-party device, such as the computing device 392.

In an embodiment, the TSM tool 320 includes a travel controller circuit 334 configured to control the scheduled traverse by the mobile device. In an embodiment, the travel controller circuit is configured to control the route and the speed of the scheduled traverse by mobile device. In an embodiment, the travel controller circuit is configured to control spacing between the mobile device and another mobile device while they are both traversing the high-voltage power transmission system. In an embodiment, the travel controller circuit is configured to determine a travel route to be taken by the mobile device. The travel route is determined based upon one or more factors including the mobile device's starting location, the number and type of obstacles along the routes, and the desired space/time of sites to be reached by the mobile device. In an embodiment, the travel controller circuit is configured to dispatch the mobile device in response to the data indicative of the scheduled traverse of the transmission line. In an embodiment, the travel controller circuit is configured to dispatch the mobile device in response to one or more factors. These factors may include the type of measurements needed, the time since previous measurements, values of previous measurements, and/or the spatial/temporal profile of measurements needed. In an embodiment, the travel controller circuit is further configured to dispatch the mobile device for another traverse over the transmission line to another portion of the high-voltage power transmission system for another measurement or activity based upon the mobile device's measurement or activity relative to the portion of the high-voltage power transmission system. In an embodiment, the travel controller circuit is further configured to dispatch another mobile device for another traverse over the transmission line to another portion of the high-voltage power transmission system for another measurement or activity. The dispatch is at least partially based upon the mobile device's measurement or activity relative to the portion of the high-voltage power transmission system. In an embodiment, the travel controller circuit is configured to dispatch the mobile device to a location on the transmission line for measurement or activity. The dispatch is at least partially based upon consideration of one or more factors including line conditions, phase, voltage or current values, loads, sources, weather and/or environmental conditions. In an embodiment, the travel controller circuit is configured to dispatch the mobile device to different portions of the high-voltage power transmission system. The dispatch is at least partially based upon consideration of the relative needs for inspection and activity at the different portions and availability of the mobile device and another mobile device. In an embodiment, the travel controller circuit is configured to dispatch the mobile device to different portions of the high-voltage power transmission system. The dispatch is at least partially based upon anticipated or predicted needs for inspection and activity at the different portions and availability of the mobile device.

In an embodiment, one or more decision-making elements of the travel controller circuit 334 are disposed at diverse locations in or about the high-voltage power transmission system 205. In an embodiment, one or more decision-making elements of the travel controller circuit are disposed in one or more mobile devices 380. In an embodiment, one or more decision-making elements of the travel controller circuit are configured to act independently of each other to control a dispatch of one or more mobile devices.

In an embodiment, the TSM tool 320 further includes a computer-readable medium 339 configured to store the scheduled traverse of the portion of the high-voltage power transmission system 205 by the mobile device 380.

In an embodiment, the mobile device 380 is configured to traverse the portion of the high-voltage power transmission system 205 and to inspect for the assessed potential operational risk. In an embodiment, the mobile device is configured to traverse the portion of the high-voltage power transmission system and to address the assessed potential operational risk. For example, addressing the assessed potential operational risk may include beginning a task. For example, addressing the assessed potential operational risk may include inspection, evaluation, repair, or a request additional information or instruction. In an embodiment, the mobile device is configured to traverse the portion of the high-voltage power transmission system and to automatically address the assessed potential operational risk. In an embodiment, the mobile device is configured to automatically traverse the portion of the high-voltage power transmission system and to automatically address the assessed potential operational risk. In an embodiment, the mobile device is configured to traverse the portion of the high-voltage power transmission system and to initiate an activity with respect to the assessed potential operational risk. In an embodiment, the mobile device is configured to traverse the portion of the high-voltage power transmission system and to initiate a repair or maintenance activity with respect to the assessed potential operational risk. In an embodiment, the mobile device includes a mobile robotic device configured to traverse the portion of the high-voltage power transmission system and to autonomously address the assessed potential operational risk. For example, in an embodiment, a mobile robotic device includes a mobile device designed to execute one or more tasks repeatedly, with speed and precision. http://searchcio-midmarket.techtarget.com/definition/robot (Last accessed Jan. 25, 2012). In an embodiment, the mobile device is configured to traverse the portion of the high-voltage power transmission system and to perform maintenance and/or repair operations responsive to the assessed potential operational risk. In an embodiment, the mobile device is configured to traverse the portion of the high-voltage power transmission system and to automatically perform maintenance and/or repair operations responsive to the assessed potential operational risk. Other examples of the mobile device are provided in conjunction with FIGS. 10-17.

The example environment 300 includes a remote computing environment, illustrated as a computing environment 392 that includes a display 394. In an embodiment, the computing environment may include one or more elements of the computing environment 19 described in conjunction with FIG. 1, or the computing environment 100 described in conjunction with FIG. 2. The example environment 300 includes a person 396. In an environment, the computing environment 392 may interact with the person, such as receiving input from the person, or providing output to the person, including via the display 394. In an embodiment, the computing environment 392 may be in wired or wireless communication with the TSM tool 320.

In an embodiment, the TSM tool 320 includes a communication module 328 is configured to output data indicative of the scheduled traverse of the transmission line by the mobile device. For example, the communication module may be configured to output data over a wired or a wireless communication path.

A prophetic example of the operation of the TSM tool in use may be illustrated by reference to FIGS. 3 and 4. For example, the receiver circuit 322 of the TSM tool 320 receives data indicative of at least one physical parameter of a high-voltage power transmission system 205 configured to transport electric power from one particular substation to another substation. For example, the high-voltage power transmission system may be a particular 500 kV overhead power transmission system built to transmit power between BPA's Big Eddy Substation near The Dalles, Oreg. to a substation four miles northwest of Goldendale, Wash. A physical parameter may include an age of the insulators along the system, a failure or repair history of the insulators, or a date the insulators were last cleaned.

Continuing with this prophetic example, the analysis circuit 324 assesses a potential operational risk to a portion of this particular high-voltage power transmission system based on the received data. A potential operational risk may include degradation or failure of the insulators. The planning circuit 326 schedules an inspection trip by a mobile device over a transmission line of the system. The scheduling is based upon the assessed potential operational risk to the system, and may weigh a possible operational significance of the assessed potential operational risk (i.e., complete failure vs. slight loss of power) in determining when the inspection trip will be scheduled. For example, the planning circuit may schedule the mobile device 380 to travel on transmission line 230.2 and perform an inspection traverse of the insulator sets 220A, 220B, etc. mounted on each tower 210. The traverse may be scheduled at some convenient time in the future if the operational risk is classified as slight. The transmission line 230.2 may be selected as providing inspection access to the insulators of the high-voltage power transmission system when the mobile device has a capacity to inspect insulators 220.A1 and 220A.3 from a position on the transmission line 230.2. If the mobile device does not have a capacity to inspect insulators away from the traveled transmission line, the planning circuit will schedule the mobile device to travel on each of the three transmission lines, 230.1, 230.2, and 230.3, and perform a respective inspection traverse of the insulators supporting each line. For example, a traverse of the transmission line 230.1 will provide the mobile device inspection access to the insulators 220A.1 and 220B.1. The communication module 328 is configured to output data indicative of the scheduled traverse of the transmission line by the mobile device. In this prophetic example, the communications module would output data indicative the scheduling a travel of the mobile on transmission line 230.2 to perform an inspection traverse the insulator sets 220A, 220B, etc. mounted on each tower 210 at a selected day and time.

Figure 5:
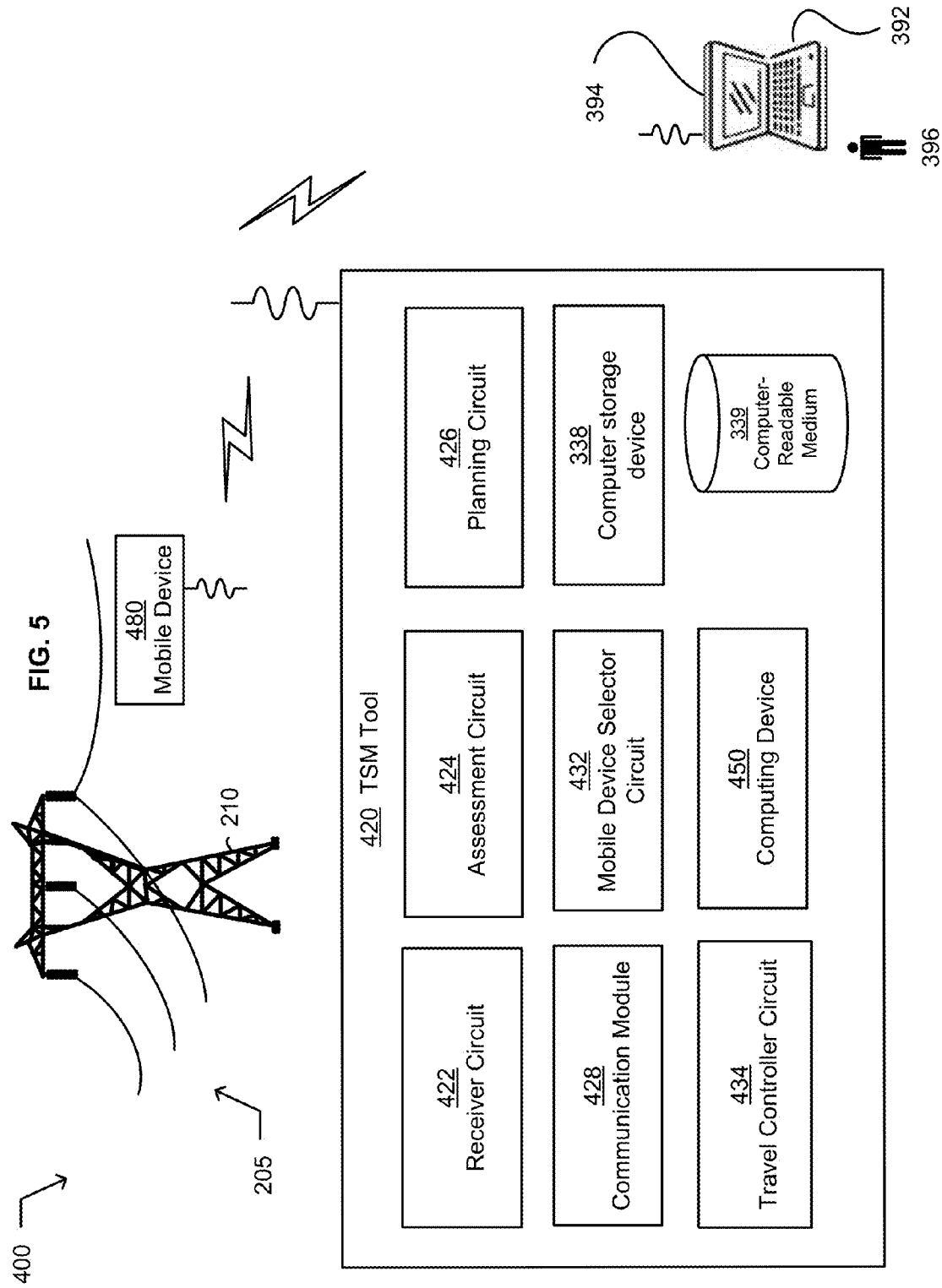
FIG. 5 illustrates an example environment 400 in which embodiments may be implemented.

FIG. 5 illustrates an example environment 400. The environment includes an apparatus, illustrated by transmission system management tool 420 (hereafter "TSM tool"). The environment includes a power transmission system, illustrated by the high-voltage power transmission system 205 configured to transport electric power from one place to another and described in conjunction with FIG. 3, and is also illustrated by the tower 210. The environment includes a mobile device 480.

In an embodiment, the power transmission system includes a high-voltage power transmission system. In an embodiment, the power transmission system includes a power distribution system.

The TSM tool 420 is configured to assess a potential inspection and/or repair need of a structure associated with the high-voltage power transmission system 205. The TSM tool is also configured to accordingly schedule a traverse by a mobile device of a transmission line of the high-voltage power transmission system in response to the potential inspection and/or repair need. The mobile device is configured to traverse the transmission line of high-voltage power transmission system, and perform an action in response to the potential inspection and/or repair need. The high-voltage power transmission system is configured to transport electric power from one place to another, and the transmission line provides access to the structure.

In an embodiment, the transmission system management tool 420 is configured to accordingly schedule and dispatch a traverse of a transmission line of the system by the mobile device 480.

In an embodiment, the mobile device 480 is configured to traverse another transmission line while traveling on the transmission line in-use. In an embodiment, the mobile device is configured for passive or active electrical inspection of the transmission line and/or structures associated with the transmission line segment. In an embodiment, the mobile device is configured to measure physical parameters of the transmission line including one or more of temperature, cleanliness, stress/strain, and/or sag. In an embodiment, the mobile device includes a camera or radar configured to address vegetation clearances of the transmission line. In an embodiment, the mobile device is configured to automatically respond to the potential inspection and/or repair need. In an embodiment, the mobile device is configured to automatically traverse a transmission line segment and to automatically respond to the potential inspection and/or repair need. In an embodiment, mobile device is configured to initiate an activity with respect to the potential inspection and/or repair need. In an embodiment, the mobile device is configured to traverse a transmission line and to autonomously address the assessed potential inspection and/or repair need for the transmission line. In an embodiment, the mobile device may be at least substantially similar to the mobile device 380 described in conjunction with FIG. 4.

In an embodiment, the TSM tool 420 may include a receiver circuit 422, and assessment circuit 424, a planning circuit 426, a communications module 428, a mobile device selector circuit 432, a travel controller circuit 434, a computing device 450, or the computer storage device 338 coupled with the computer-readable medium 339.

Figure 6:
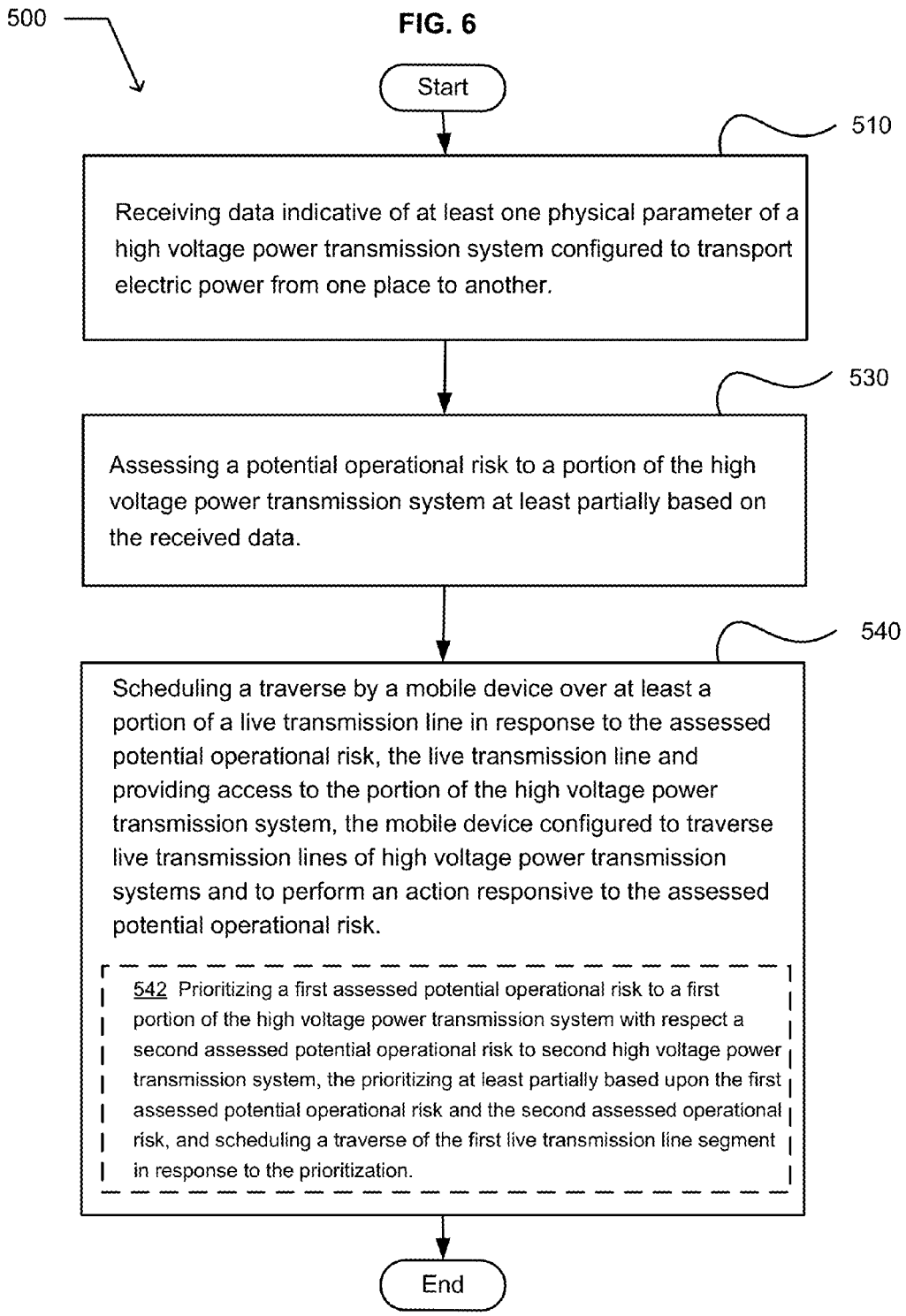
FIG. 6 illustrates an example operational flow 500 in which embodiments may be implemented.

FIG. 6 illustrates an example operational flow 500. After a start operation, the operational flow includes a reception operation 510. The reception operation includes receiving data indicative of at least one physical parameter of a power transmission system configured to transport electric power from one place to another. In an embodiment, the reception operation may be implemented using the receiver circuit 322 described in conjunction with FIG. 4. An analysis operation 530 includes assessing a potential operational risk to a portion of the power transmission system at least partially based on the received data. In an embodiment, the reception operation may be implemented using the analysis circuit 324 described in conjunction with FIG. 4. A planning operation 540 includes scheduling a traverse by a mobile device over at least a portion of a transmission line in response to the assessed potential operational risk. The transmission line provides access to the portion of the power transmission system. In an embodiment, the planning operation may be implemented using the planning circuit 326 described in conjunction with FIG. 4. The mobile device is configured to traverse transmission lines of a power transmission system and perform an action in response to the assessed potential operational risk of the power transmission system. In an embodiment, the mobile device may be implemented using the mobile device 380 described in conjunction with FIG. 4. The operational flow includes an end operation.

In an embodiment, the power transmission system includes a high-voltage power transmission system. In an embodiment, the power transmission system includes a power distribution system.

In an embodiment, the planning operation 540 may include at least one additional operation, such as the operation 542. The operation 542 includes prioritizing a first assessed potential operational risk to a first portion of the high-voltage power transmission system with respect a second assessed potential operational risk to second high-voltage power transmission system and scheduling a traverse of the first transmission line segment in response to the prioritization. The prioritizing is at least partially based upon the first assessed potential operational risk and the second assessed operational risk.

Figure 7:
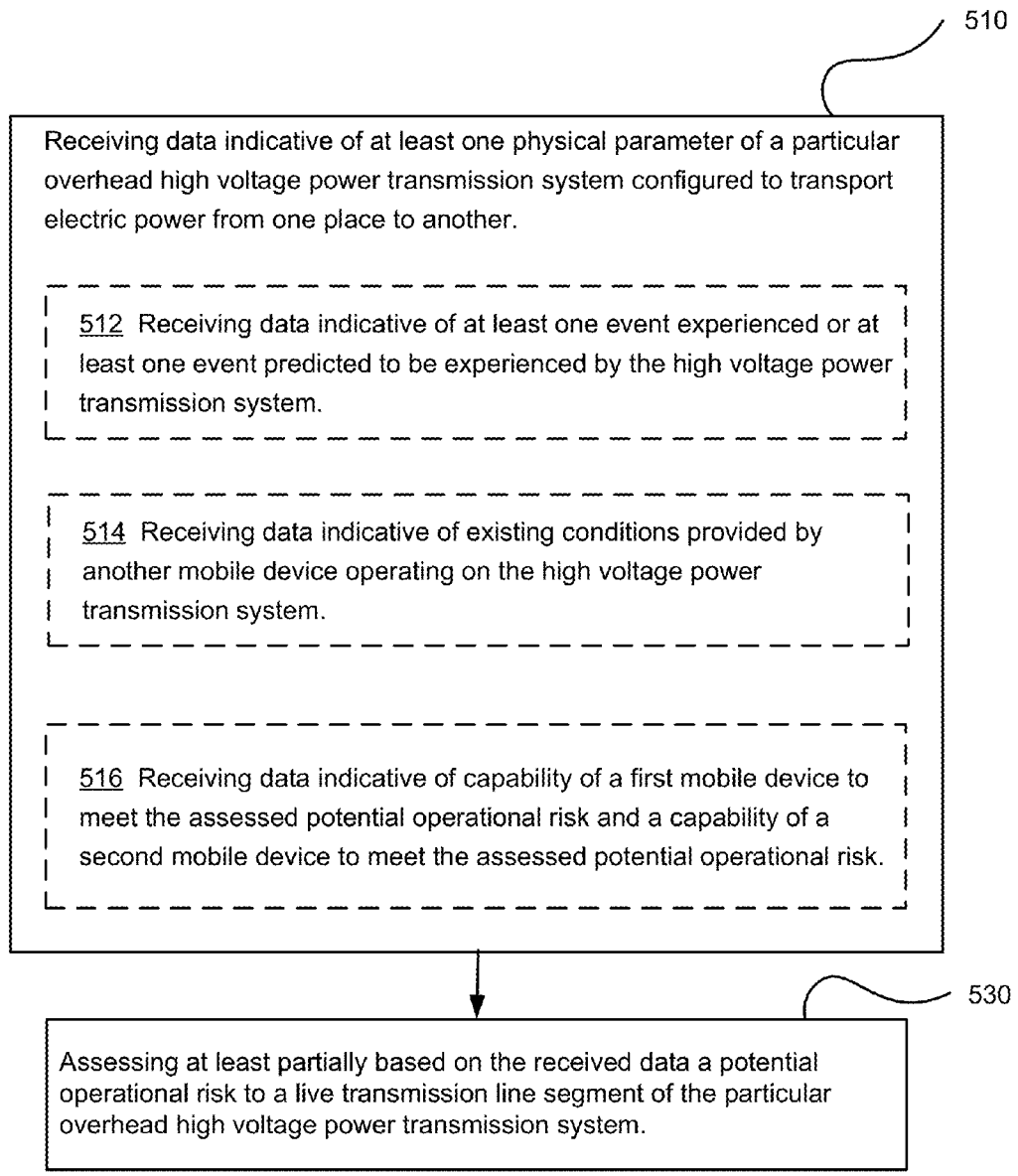
FIG. 7 illustrates an alternative embodiment of the reception operation 510 of FIG. 6.

FIG. 7 illustrates an alternative embodiment of the reception operation 510 of FIG. 6. The reception operation may include at least one additional operation. The at least one additional operation may include an operation 512, an operation 514, or an operation 516. The operation 512 includes receiving data indicative of at least one event having an effect on or predicted to have an effect on the high-voltage power transmission system. The operation 514 includes receiving data indicative of existing condition affecting the high-voltage power transmission system provided by another mobile device operating on the high-voltage power transmission system. The operation 516 includes receiving data indicative of capability of a first mobile device to meet the assessed potential operational risk and a capability of a second mobile device to meet the assessed potential operational risk.

Figure 8:
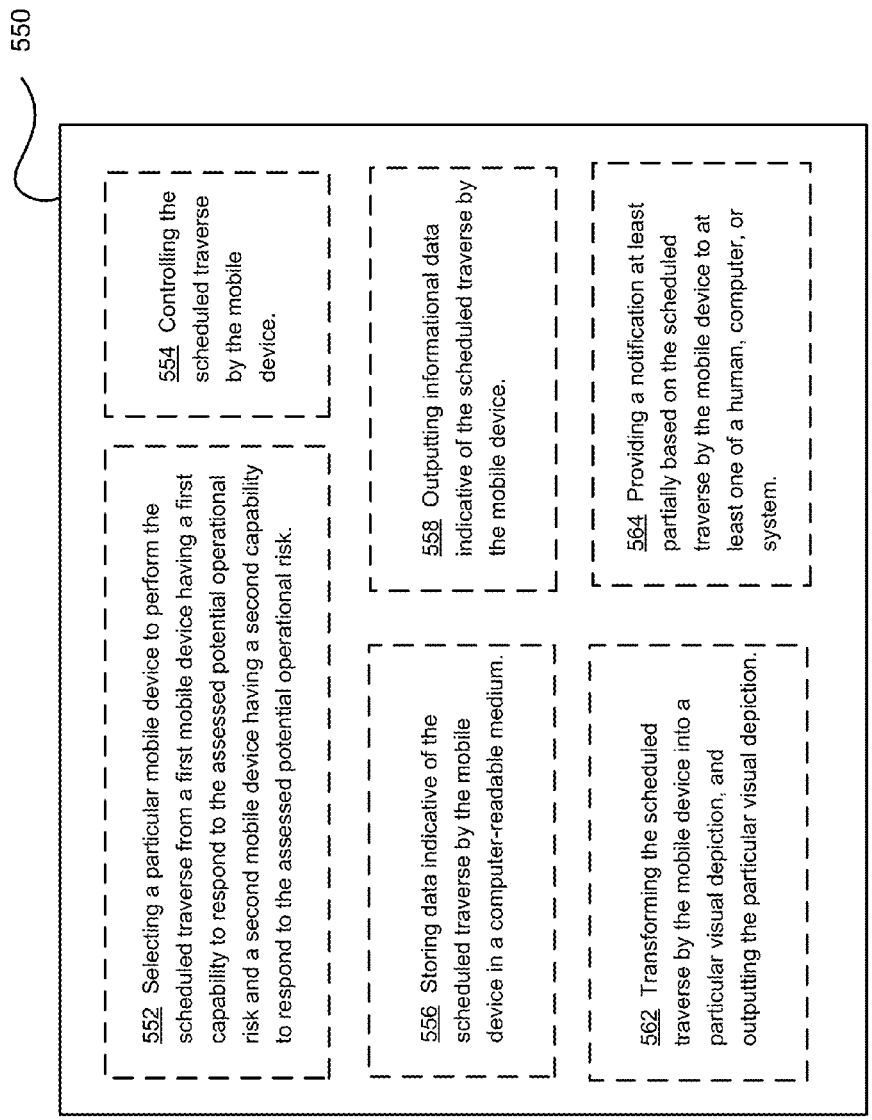
FIG. 8 illustrates alternative embodiments of the operational flow 500 of FIG. 6.

FIG. 8 illustrates alternative embodiments of the operational flow 500 of FIG. 6. The operational flow may include at least one operation, illustrated as the operation 550. The operation 550 may include an operation 552, an operation 554, an operation 556, an operation 558, an operation 562, or an operation 564. The operation 552 includes selecting a particular mobile device to perform the scheduled traverse from a first mobile device having a first capability to respond to the assessed potential operational risk and a second mobile device having a second capability to respond to the assessed potential operational risk. The operation 554 includes controlling the scheduled traverse by the mobile device. The operation 556 includes storing data indicative of the scheduled traverse by the mobile device in a computer-readable medium. The operation 558 includes outputting informational data indicative of the scheduled traverse by the mobile device. The operation 562 includes transforming the scheduled traverse by the mobile device into a particular visual depiction, and outputting the particular visual depiction. The operation 564 includes providing a notification at least partially based on the scheduled traverse by the mobile device to at least one of a human, computer, or system.

In an embodiment, the mobile device is configured to automatically traverse live transmission lines and to automatically respond to the assessed potential operational risk. In an embodiment, the mobile device includes a mobile robotic device configured to autonomously traverse live transmission lines and to autonomously respond to the assessed potential operational risk. In an embodiment, the high-voltage power transmission system includes an overhead high-voltage power transmission system. In an embodiment, the high-voltage power transmission system includes a particular high-voltage power transmission system.

FIG. 9 illustrates a computer program product 600. The computer program product includes computer-readable media 610 bearing program instructions 620. The program instructions which, when executed by a processor of a computing device, cause the computing device to perform a process. The process includes receiving data indicative of at least one physical parameter of a power transmission system configured to transport electric power from one place to another. The process includes assessing a potential operational risk to a portion of the power transmission system at least partially based on the received data. The process includes scheduling a traverse by a mobile device over a live transmission line based upon the assessed potential operational risk. The live transmission line provides access to the portion of the power transmission system. The mobile device is configured to traverse live transmission lines and perform an action on the power transmission system in response to the assessed potential operational risk.

In an embodiment, the process includes 622 providing a notification at least partially based on the data indicative of the scheduled traverse to at least one of a human, computer, or system. In an embodiment, the process includes 624 transforming the data indicative of the scheduled traverse into a particular visual depiction, and outputting the particular visual depiction. In an embodiment, the process includes 626 outputting data indicative of the scheduled traverse of the live transmission line by the mobile device.

In an embodiment, the computer-readable media 610 includes a tangible computer-readable media 612. In an embodiment, the computer-readable media includes a communication media 614. In an embodiment, the power transmission system includes a high-voltage power transmission system. In an embodiment, the power transmission system includes a power distribution system.

Figure 10:
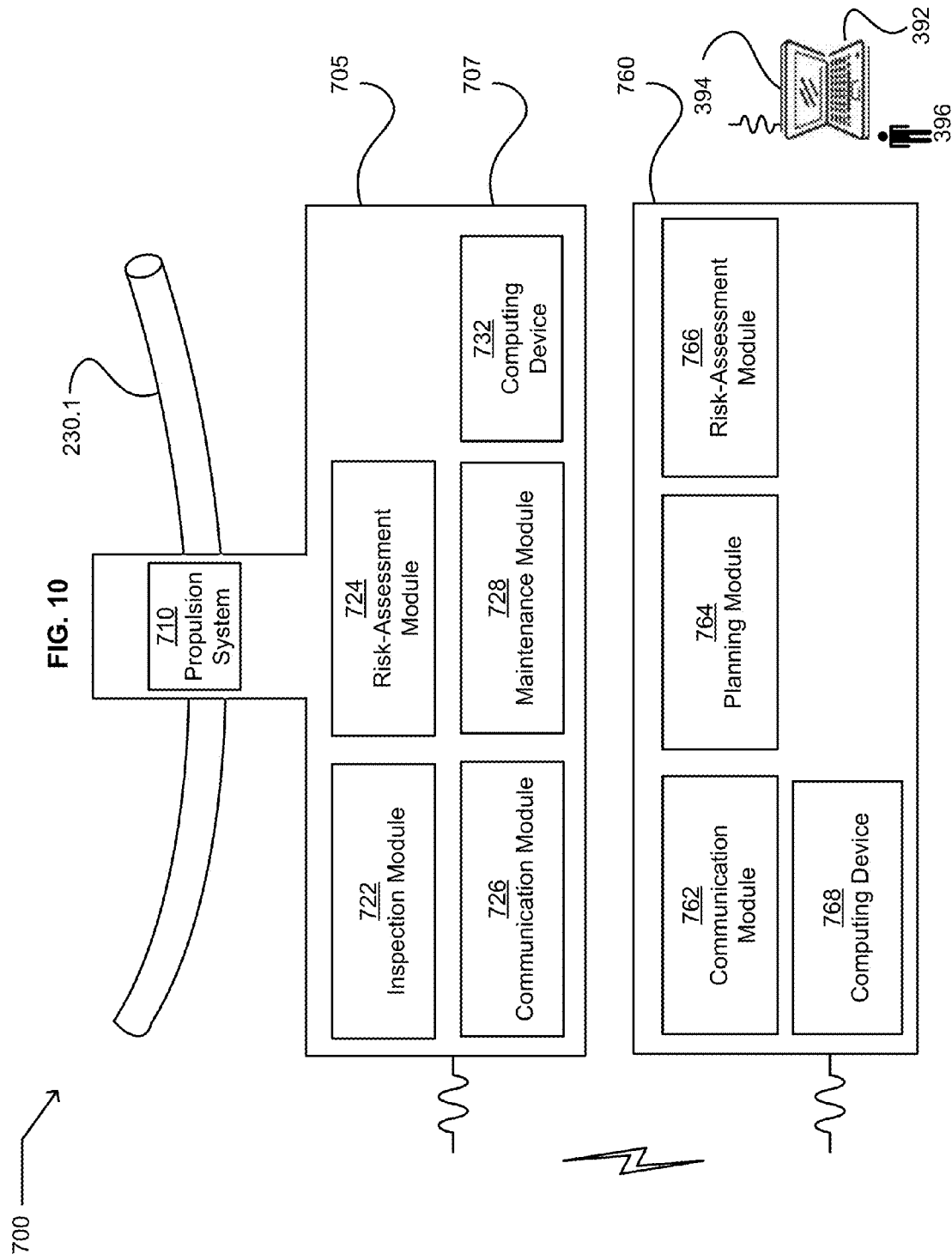
FIG. 10 illustrates an example environment 700 in which embodiments may be implemented.

FIG. 10 illustrates an example environment 700. The environment includes a transmission line of a live power transmission system, which is illustrated as the live transmission line 230.1 of the overhead high-voltage power transmission system 205 described in conjunction with FIG. 3. The environment also includes a mobile robotic device 705. The mobile device includes a mobile chassis 707 configured to travel on a live transmission line of a power transmission system propelled by a propulsion system 710. The mobile device includes an inspection module 722 physically associated with the mobile chassis and configured to automatically inspect a structure associated with the live power transmission system. The mobile device includes a risk-assessment module 724 physically associated with the mobile chassis and configured to assess a potential risk to the power transmission system in response to inspection data provided by the inspection module. The mobile device includes a communication module 726 physically associated with the mobile chassis and configured to output data indicative of the assessed potential risk.

In an embodiment, the power transmission system includes a high-voltage power transmission system. In an embodiment, the power transmission system includes a power distribution system.

Those skilled in the art will recognize that in an embodiment, aspects of the mobile robotic device 705 can be implemented using a hardware, software, and/or firmware implementation. Those skilled in the art will recognize that in an embodiment aspects of the mobile device can be implemented, individually and/or collectively, by various types of electro-mechanical systems having a wide range of electrical components such as hardware, software, firmware, and/or virtually any combination thereof. Those skilled in the art will recognize that in an embodiment aspects of the mobile device can be implemented using a general purpose computer programmed to carry out or perform one or more particular functions of the mobile device. For example, aspects of the mobile device can be implemented using a computing device 732. In an embodiment, the computing device may be implemented in part or whole using the general purpose thin computing device 20 described in conjunction with FIG. 1. In an embodiment, the computing device may be implemented in part or whole using the purpose computing device 100 described in conjunction with FIG. 2.

In an embodiment, the live transmission line is an overhead live transmission line. In an embodiment, the live transmission line is an underground live transmission line. In an embodiment, the transmission line is a depowered transmission line.

An example of a propelled mobile chassis is described by U.S. Pat. No. 4,904,996 to Fermandes. An example of a propelled mobile chassis is described by U.S. Pat. No. 7,496,459 to McAllister and United States Pat. App Pub. 2008/0249723 by McAllister. An example of a propelled mobile chassis is described by U.S. Pat. No. 7,282,944 to Gunn, United States Pat. App Pub. 2008/0246507 by Gunn, and United States Pat. App Pub. 2005/0017751 by Gunn. An example of a propelled mobile chassis is described by U.S. Pat. No. 6,494,141 to Montambault.

An example of a propelled mobile chassis is described by B Jiang & AV Mamishev, *Mobile Monitoring and Maintenance of Power Systems* (University of Washington) (undated) (accessed at http://www.ee.washington.edu/research/seal/pubfiles/Sci07.pdf on Feb. 29, 2012). An example of a propelled mobile chassis is described T Li, F Lijin, & W Hongguang, *Development of an Inspection Robot Control System for 500 kV Extra-High-voltage Power Transmission Lines*, SICE 2004 Annual Conference Sapporo Japan (August 2004). An example of a propelled mobile chassis is described by A. De Souza, et al, 1 *Inspection Robot for High-Voltage Transmission Lines* 1-7, (ABCM Symposium Series in Mechatronics 2004) (accessed at http://www.abcm.org.br/symposiumseries/ssm_vol1/section_i_robotics/ssm_i_01.pdf on Feb. 29, 2012). An example of a propelled mobile chassis is described by X Xiao, et al., *An Inspection Robot for High-voltage Power Transmission Line and its Dynamic Study* (Wuhan University, P. R. China) (undated) (accessed at http://www.intechopen.com/source/pdfs/5322/InTech-An_inspection_robot_for_high_voltage_power_transmission_line_and_its_dynamics_study.pdf on Feb. 29, 2012). An embodiment of a propelled mobile chassis is described by Z Tingyu, et al., *Development of a Dual-Arm mobile Robot for High-voltage Power Lines* 1924-1929 (IEEE International Conference on Robotics and Biomimetics, 2007. ROBIO 2007). An example of a propelled mobile chassis is described by N Pouliot, et al., *Geometric Design of the LineScout, a Teleoperated Robot for Power Line Inspection and Maintenance* (IEEE International Conference on Robotics and Automation, 2008. ICRA 2008). An example of a propelled mobile chassis is described by S Montambault, et al., *Design and Validation of a Mobile Robot for Power Line Inspection and Maintenance* (6th International Conference on Field and Service Robotics-FSR 2007, Chamonix France 2007) (accessed at http://hal.inria.fr/docs/00/19/47/17/PDF/fsr_15.pdf on Feb. 29, 2012). An example of a propelled mobile chassis is described by H san Segundo, et al., *Automated Inspection of Electric Transmission Lines: The power supply system* (IEEE 2006) (accessed at http://ieeexplore.ieee.org/stamp/stamp.jsp?tp=&arnumber=4152907&userType=&tag=1 on Mar. 5, 2012)

In an embodiment, the inspection module 722 is configured to automatically inspect the structure for a potential damage or deterioration. In an embodiment, the inspection module is configured to automatically inspect the structure for a potential damage or deterioration caused by normal wear and tear. In an embodiment, the inspection module is configured to automatically inspect the structure for a potential damage or deterioration caused by aging of the structure. In an embodiment, the inspection module is configured to automatically inspect the structure for a potential damage or deterioration caused by a weather event. In an embodiment, the inspection module is configured to automatically inspect the structure for potential damage or deterioration caused by standing water. In an embodiment, the inspection module is configured to automatically inspect the structure for a potential maintenance, repair, or modification need. In an embodiment, the inspection module is configured to automatically inspect for encroaching vegetation. In an embodiment, the structure includes at least one of the transmission line, other transmission lines, insulators, ground line, encasement, cooling system, or towers associated with the power transmission system.

In an embodiment, the risk-assessment module 724 is configured to assess a potential risk to the power transmission system from normal wear and tear in response to data provided by the inspection module. In an embodiment, the risk-assessment module is configured to assess a potential risk to the power transmission system from encroaching vegetation in response to data provided by the inspection module. In an embodiment, the risk-assessment module is configured to assess a potential risk to the power transmission system from encroaching vegetation. The assessment is in response to data provided by the inspection module and in response to data indicative of the encroaching vegetation at a previous inspection. For example, including in the assessment of a potential risk data from a previous inspection is expected to provide a baseline for assessing how fast the encroaching vegetation is growing. In an embodiment, the risk-assessment module is configured to assess a potential risk to the power transmission system from encroaching vegetation. The assessment is in response to data provided by the inspection module, and in response to imaging, triangulation and/or time-of-flight measurement data to determine the height or extent of encroaching vegetation. In an embodiment, the risk-assessment module is configured to assess a potential risk to the power transmission system from encroaching vegetation. The assessment is in response to data provided by the inspection module, and in response to one or more local geographic or topographic factors. These factors may include whether the vegetation is above, below or to the side of the power line, and/or whether the vegetation is uphill or upwind from the power line.

In an embodiment, the mobile device 705 includes a maintenance module 728 physically associated with the mobile chassis and configured to perform a maintenance, repair, or modification activity relative to the power transmission system in response to the assessed potential risk. In an embodiment, the maintenance module is configured to automatically perform a maintenance, repair, or modification activity relative to the power transmission system. In an embodiment, the maintenance module is configured to perform a maintenance, repair, or modification activity relative to the power transmission system in response to a received authorization. In an embodiment, the maintenance module is configured to repair damage or deterioration to the structure associated with the power transmission system. In an embodiment, the maintenance module is configured to repair or modify an insulator associated with the power transmission system In an embodiment, the maintenance module is configured to perform a maintenance, repair, or modification activity to the structure associated with the power transmission system. In an embodiment, the maintenance module is configured to trim vegetation encroaching the structure associated with the power transmission system. In an embodiment, the maintenance module is configured to trim vegetation encroaching the structure associated with the power transmission system. The trimming may by delivery of electrical energy, photonic energy, or chemical spray, and/or by physical cutting. In an embodiment, the maintenance module is configured to repair or clean a power line insulator. In an embodiment, the maintenance module is configured to de-ice a transmission line. In an embodiment, the maintenance module is configured to apply a deicing compound or fluid to a transmission line. In an embodiment, the maintenance module is configured to mechanically de-ice a transmission line. In an embodiment, the maintenance module is configured to apply heat to a transmission line. For example, heat may be applied by blowing warm air or by resistive heating.

FIG. 10 also illustrates another embodiment of the example environment 700. This embodiment includes the mobile robotic device 705 and a transmission system management tool, hereafter referred to as TSM tool 760. The robotic device is configured to travel on a transmission line of a power transmission system and to automatically inspect a structure associated with the power transmission system. The TSM tool is configured to assess a potential risk to the power transmission system in response to inspection data provided by the mobile device, and accordingly to initiate a maintenance, repair, or modification activity relative to the structure of the power transmission system by the mobile robotic device or another mobile device. In an embodiment, the TSM tool may include a communication module 762, a planning module 764, a risk-assessment module 766, or a computing device 768.

In an embodiment, the power transmission system includes a high-voltage power transmission system. In an embodiment, the power transmission system includes a power distribution system.

Those skilled in the art will recognize that, in an embodiment, aspects of the TSM tool 760 can be implemented using a hardware, software, and/or firmware implementation. Those skilled in the art will recognize that in an embodiment aspects of the TSM tool can be implemented, individually and/or collectively, by various types of electro-mechanical systems having a wide range of electrical components such as hardware, software, firmware, and/or virtually any combination thereof. Those skilled in the art will recognize that in an embodiment aspects of the TSM tool can be implemented using a general purpose computer programmed to carry out or perform one or more particular functions of the TSM tool. For example, aspects of the TSM tool can be implemented using a computing device 768. In an embodiment, the computing device may be implemented in part or whole using the general purpose thin computing device 20 described in conjunction with FIG. 1. In an embodiment, the computing device may be implemented in part or whole using the purpose computing device 100 described in conjunction with FIG. 2.

In an embodiment, the mobile robotic device 705 is further configured to wirelessly communicate with the TSM tool 760. In an embodiment, the transmission system management tool is further configured to wirelessly communicate with the mobile robotic device. In an embodiment, the transmission system management tool is further configured to be stationed at a fixed location. In an embodiment, the transmission system management tool is configured to assess a potential risk to the power transmission system in response to inspection data provided by the mobile device. The transmission system management tool is configured to accordingly schedule and authorize the mobile robotic device or another mobile robotic device to perform a maintenance, repair, or modification activity relative to the structure of the power transmission system.

Figure 11:
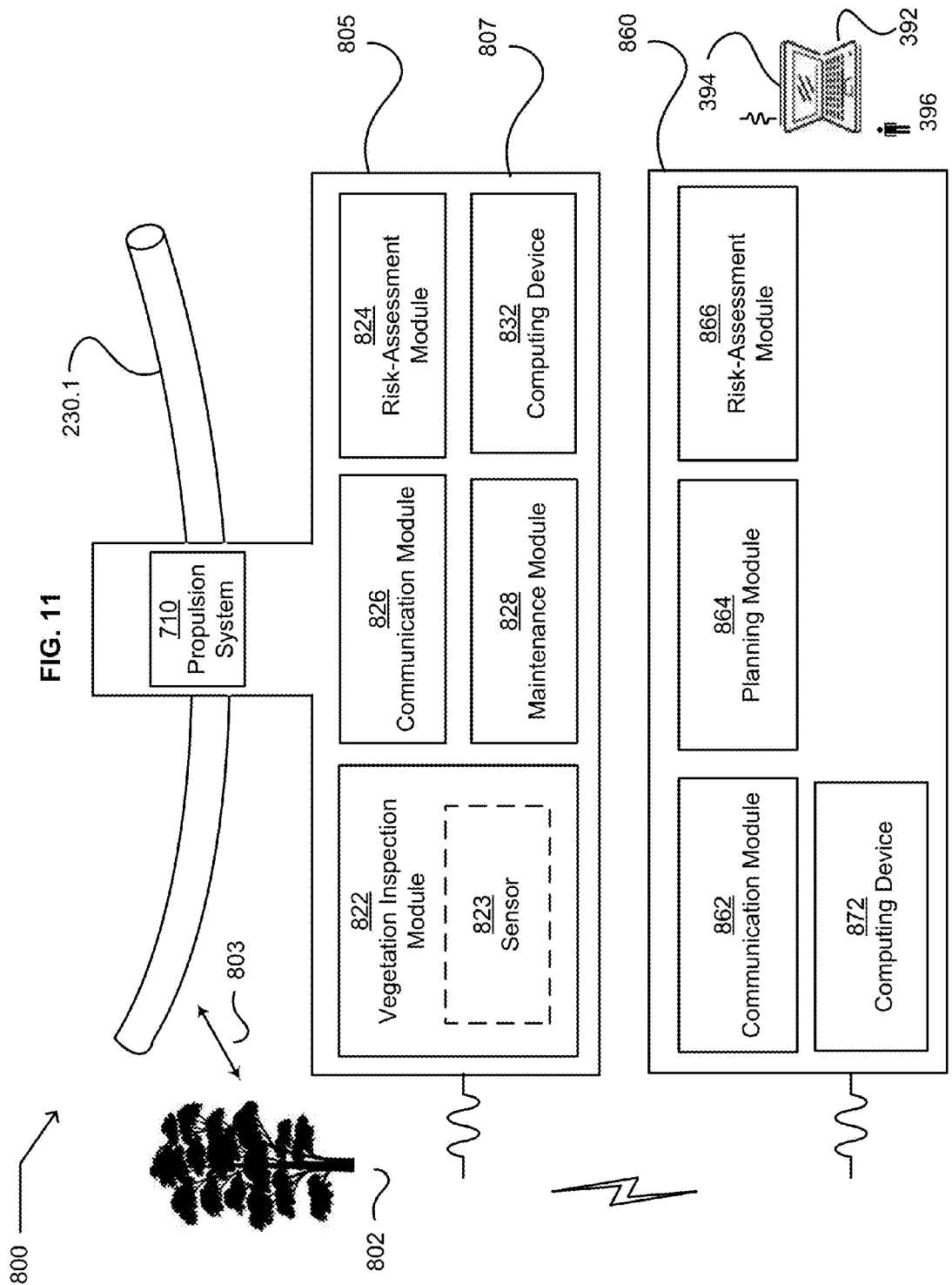
FIG. 11 illustrates an example environment 800 in which embodiments may be implemented.

FIG. 11 illustrates an example environment 800. The environment includes a transmission line of a power transmission system, which is illustrated as the transmission line 230.1 of the overhead high-voltage power transmission system 205 described in conjunction with FIG. 3. The environment also includes a mobile robotic device 805. The mobile device includes a mobile chassis 807 configured to travel on a transmission line of the power transmission system propelled by the propulsion system 710. The mobile device includes a vegetation inspection module 822 physically associated with the mobile chassis and configured to measure a characteristic of vegetation growing proximate to a portion of the overhead power transmission system. For example, FIG. 11 illustrates vegetation 802 growing proximate 803 to the transmission line 230.1. The mobile device includes a communication module 826 physically associated with the mobile chassis and configured to output data indicative of the measured characteristic of the vegetation.

Those skilled in the art will recognize that in an embodiment aspects of the mobile device 805 can be implemented using a hardware, software, and/or firmware implementation. Those skilled in the art will recognize that in an embodiment, aspects of the mobile device can be implemented, individually and/or collectively, by various types of electro-mechanical systems having a wide range of electrical components such as hardware, software, firmware, and/or virtually any combination thereof. Those skilled in the art will recognize that in an embodiment aspects of the mobile device can be implemented using a general purpose computer programmed to carry out or perform one or more particular functions of the mobile device. For example, aspects of the mobile device can be implemented using a computing device 832. In an embodiment, the computing device 832 may be implemented in part or whole using the general purpose thin computing device 20 described in conjunction with FIG. 1. In an embodiment, the computing device 832 may be implemented in part or whole using the purpose computing device 100 described in conjunction with FIG. 2.

In an embodiment, the vegetation 802 growing proximate includes previously known vegetation growing proximate to a portion of the overhead power transmission system 205. In an embodiment, the vegetation growing proximate includes previously unknown vegetation growing proximate to a portion of the overhead power transmission system.

In an embodiment, the vegetation inspection module 822 includes a sensor 823 configured to measure a height or extent of vegetation relative to the transmission line. In an embodiment, the sensor includes a camera, radar, lidar, or sonar device.

In an embodiment, the communication module 862 is configured to wirelessly output data indicative of the measured characteristic of the vegetation. For example, the data indicative of the measured characteristic of the vegetation may be wireless communicated to a vegetation management tool 860. In an embodiment, the vegetation management tool may include a planning module 864, a or risk-assessment module 866. In an embodiment, the vegetation management tool includes a computing device 872. In an embodiment, the communication module is configured to communicate with a maintenance module 828 configured to trim vegetation.

In an embodiment, the mobile device 805 includes the maintenance module 828 physically associated with the mobile chassis and configured to trim vegetation growing proximate to a portion of the overhead power transmission system. In an embodiment, the maintenance module is configured to trim vegetation growing proximate to a portion of the overhead power transmission system in response to the outputted data indicative of the measured characteristic of the vegetation. In an embodiment, the maintenance module is configured to automatically trim vegetation growing proximate to a portion of the overhead power transmission system. In an embodiment, the maintenance module is configured to trim vegetation growing proximate to a portion of the overhead power transmission system in response to an instruction originated by a vegetation management tool.

Figure 12:
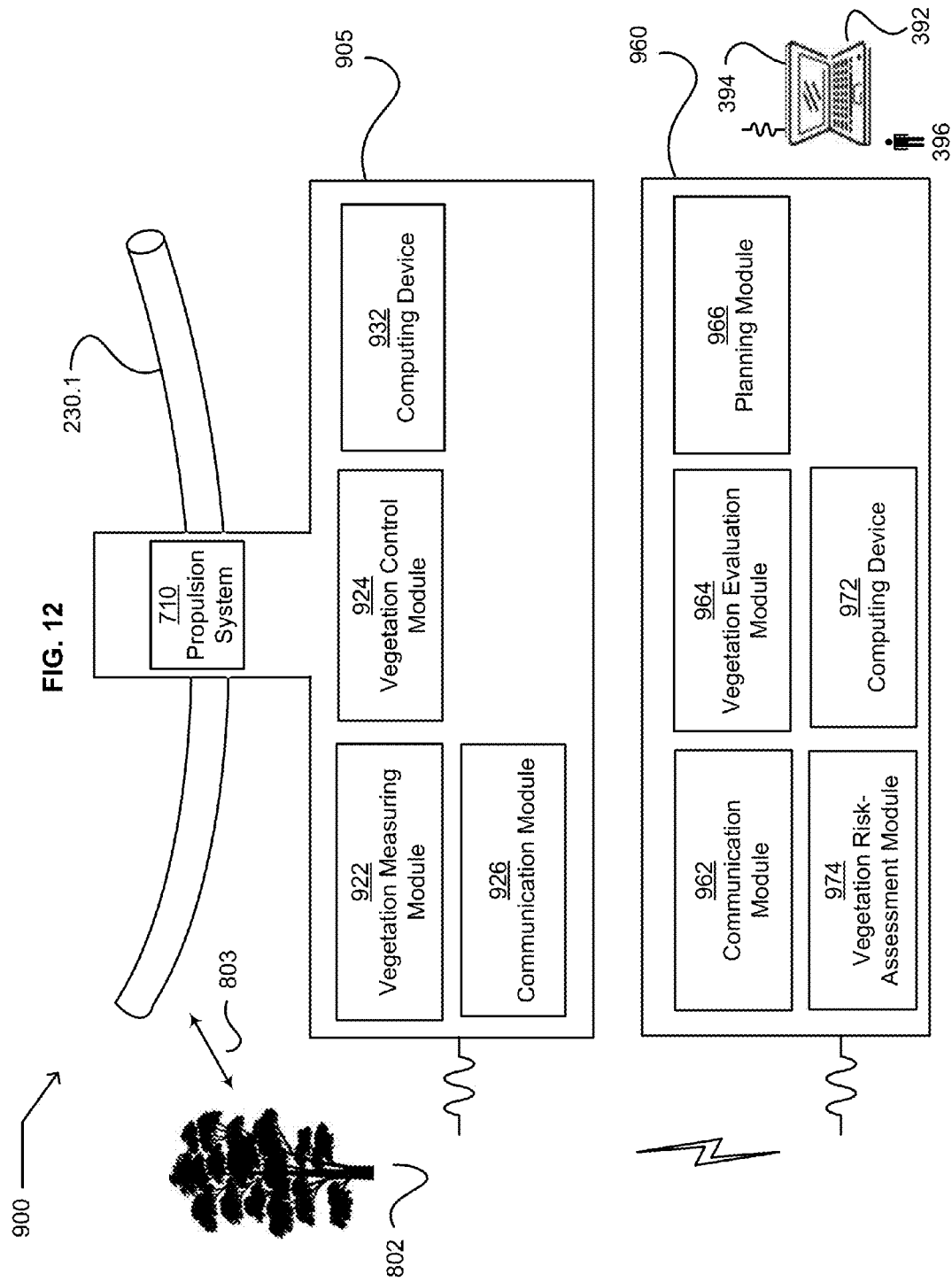
FIG. 12 illustrates an example environment 900 in which embodiments may be implemented.

FIG. 12 illustrates an example environment 900. The environment includes a transmission line of a power transmission system, which is illustrated as the transmission line 230.1 of the overhead high-voltage power transmission system 205 described in conjunction with FIG. 3. The environment also includes a mobile device 905 and a vegetation management tool 960. The mobile device is configured to travel on or along a transmission line of a power transmission system and measure one or more characteristics of vegetation encroaching the power transmission system.

In an embodiment, the power transmission system includes a high-voltage power transmission system. In an embodiment, the power transmission system includes a power distribution system.

In an embodiment, the mobile device 905 may include a vegetation measuring module 922, a vegetation control module 924, or a communication module 926. In an embodiment, the mobile device is further configured to trim the encroaching vegetation to address the assessed risk. For example, trimming encroaching vegetation may be implemented using the vegetation control module 924. In an embodiment, the mobile device is configured to trim vegetation using electrical or photonic energy, chemical spray, and/or physical cutting.

Those skilled in the art will recognize that in an embodiment aspects of the mobile device 905 can be implemented using a hardware, software, and/or firmware implementation. Those skilled in the art will recognize that in an embodiment, aspects of the mobile device can be implemented, individually and/or collectively, by various types of electro-mechanical systems having a wide range of electrical components such as hardware, software, firmware, and/or virtually any combination thereof. Those skilled in the art will recognize that in an embodiment aspects of the mobile device can be implemented using a general purpose computer programmed to carry out or perform one or more particular functions of the mobile device. For example, aspects of the mobile device can be implemented using a computing device 932. In an embodiment, the computing device may be implemented in part or whole using the general purpose thin computing device 20 described in conjunction with FIG. 1. In an embodiment, the computing device may be implemented in part or whole using the purpose computing device 100 described in conjunction with FIG. 2.

The vegetation management tool 960 is configured to address the measured one or more characteristics and assess risk to the power transmission system posed by the encroaching vegetation. In an embodiment, the vegetation management tool may include a communication module 962, a vegetation evaluation module 964, a planning module 966, or a vegetation risk-assessment module 974. In an embodiment, the vegetation management tool is configured to assess risk to the power transmission system posed by the encroaching vegetation at least partially based on generally available guidelines and/or protocols. In an embodiment, the vegetation management tool is configured assess risk to the power transmission system posed by the encroaching vegetation at least partially based on generally available guidelines and/or protocols. In an embodiment the vegetation management tool is configured assess risk to the power transmission system posed by the encroaching vegetation. The risk is assessed at least partially based on particular guidelines and/or protocols for the power transmission system. In an embodiment, the vegetation management tool is configured to use imaging, triangulation, and/or time-of-flight measurement data to determine a height or extent of the encroaching vegetation. In an embodiment, the vegetation management tool is configured to determine clearances between encroaching vegetation and the transmission line in response to the measured one or more characteristics of the encroaching vegetation. In an embodiment, the vegetation management tool is configured to assess risk to the power transmission system from the encroaching vegetation. The risk is assessed based on one or more local geographic or topographic factors including whether the encroaching vegetation is above, below or to the side of the power transmission system, and/or whether the encroaching vegetation is uphill or upwind from the power transmission system. In an embodiment, the vegetation management tool is configured to assess risk to the transmission line from the encroaching vegetation based on a time-lapse analysis of changes in the height or extent of the encroaching vegetation. In an embodiment, the vegetation management tool is configured to address a measured clearance between the encroaching vegetation and the power transmission system. The vegetation management tool is also configured to automatically assess risk to the transmission line posed by the encroaching vegetation based on the measured clearance. In an embodiment, the vegetation management tool is configured to address a measured clearance between the encroaching vegetation and the power transmission system. The vegetation management tool is also configured to automatically assess risk to the transmission line posed by the encroaching vegetation based on the measured clearance and on a specified sag value of a transmission line of the power transmission system. In an embodiment, the vegetation management tool is configured to address a measured clearance between the encroaching vegetation and a transmission line of the power transmission system. The vegetation management tool is also configured to automatically assess risk to the transmission line posed by the encroaching vegetation based on the measured clearance and on a specified wind environment of the transmission line. For example, the specified wind environment may include a predicted or an existing wind environment.

FIG. 17 illustrates an environment 1400. The environment includes a power transmission system, illustrated by the portion of the tower 210A, the insulator 220A.1, and the transmission line 230.1 of the high-voltage power transmission system 205 described in conjunction with FIG. 3. The environment also includes a system 1405. The system includes a stationary device 1420 and a mobile device 1460. The stationary device is configured to be electrically coupled to a transmission line of a power transmission system and remain at a fixed location during a test measurement of the power transmission system. The stationary device is illustrated coupled to the transmission line using conductor 1412 and connector 1414. The mobile device is configured to travel on the transmission line. In an embodiment, the mobile device may be substantially similar to the mobile device 1005 or the mobile device 1070 described in conjunction with FIG. 13. In an embodiment, the mobile device includes a mobile robotic device. The stationary device and the mobile device are further configured to cooperatively measure properties of the power transmission system.

In an embodiment, the power transmission system includes a high-voltage power transmission system. In an embodiment, the power transmission system includes a power distribution system.

In an embodiment, the stationary device 1420 and the mobile device 1460 are configured to cooperatively measure properties of a component of the power transmission system located between the stationary device and the mobile device. In an embodiment, the stationary device and the mobile device are configured to automatically and cooperatively measure properties of the power transmission system. In an embodiment, the stationary device and the mobile device are configured to cooperatively measure electrical and/or mechanical properties of the power transmission system. In an embodiment, the stationary device and the mobile device are configured to automatically and cooperatively determine a voltage standoff-capability of an insulator supporting or holding the transmission line. In an embodiment, one of the stationary device or the mobile device is configured to apply a test excitation to the transmission line, and the other of the stationary device or the mobile device is configured measure a response of the transmission line to the test excitation.

In an embodiment, the test excitation frequency is at about a nominal transmission line excitation frequency. In an embodiment, the test excitation frequency is different than a nominal transmission line excitation frequency. In an embodiment, the test excitation is applied to the live transmission line at about zero crossings in the excitation carried by the live transmission line. In an embodiment, the at about the zero crossings includes not more than plus or minus ten degrees of the zero crossings in excitation carried by the live transmission line. In an embodiment, the at about the zero crossings includes not more than plus or minus five degrees of the zero crossings in the excitation carried by the live transmission line. In an embodiment, the at about the zero crossings includes not more than plus or minus two degrees of the zero crossings in excitation carried by the live transmission line. In an embodiment, the at about the zero crossings includes not more than plus or minus one degree of the zero crossings in excitation carried by the live transmission line. In an embodiment, the test excitation is applied to the live transmission line during a select time portion of a frequency cycle of the excitation carried by the live transmission line. In an embodiment, the mobile device is configured to apply a test excitation to an insulator supporting or holding the transmission line and the stationary device is configured measure a response of the insulator to the test excitation. In an embodiment, the stationary device and the mobile device are configured to cooperatively conduct a passive or active electrical inspection of the transmission line and/or structures associated with the transmission line. In an embodiment, the stationary device and the mobile device are configured to cooperatively measure physical transmission line parameters including one or more of temperature, cleanliness, stress/strain, and/or sag.

In an embodiment, the mobile device 1005 includes a sensor (not illustrated) configured to measure a height or extent of encroaching vegetation along the transmission line. In an embodiment, the sensor includes a camera, radar, lidar, or sonar device.

In an embodiment, the system 1405 includes a test controller 1460 configured to manage the cooperative measurement of properties of the power transmission system by the stationary device 1420 and the mobile device 1005. In an embodiment, the test controller is further configured to control an aspect of travel over the transmission line by the mobile device. In an embodiment, the test controller is further configured to initiate a cooperative measurement of properties of the power transmission system. In an embodiment, the test controller is further configured to receive data indicative of the cooperatively measured properties from the stationary device or the mobile device. In an embodiment, the test controller is further configured to output informational data responsive to the data indicative of the cooperatively measured properties.

An embodiment includes method. After a start operation, an operational flow of the method includes electrically coupling a stationary device at a fixed location to a transmission line of a power transmission system. For example, in an embodiment, this operation may be implemented by using the conductor 1412 and the connector 1414 to electrically couple the stationary device 1420 to the transmission line 230.1 described in conjunction with FIG. 17. The operational flow includes initiating travel of a mobile device over the transmission line 230.1 to a selected location on the transmission line. For example, in an embodiment, this operation may be implemented by initiating travel of the mobile device 1005 over the transmission line described in conjunction with FIG. 17 using the travel control module 1052 described in conjunction with FIG. 14. The operational flow includes measuring a property of a structure of the power transmission system using the stationary device and the mobile device. The stationary device and the mobile device are configured to cooperatively measure the property of the structure. The operational flow includes outputting data indicative of the measured property of the structure. For example, in an embodiment, this operation may be implemented using the communication module 1028 or the communication module 1056 described in conjunction with FIG. 14. The operational flow includes an end operation. In an embodiment, the operational flow may include at least one additional operation. The at least one additional operation may include managing the cooperative measurement of the property of the power transmission system by the stationary device and the mobile device. For example, in an embodiment, this operation may be implemented using the cooperation control module 1054 described in conjunction with FIG. 14.

Figure 13:
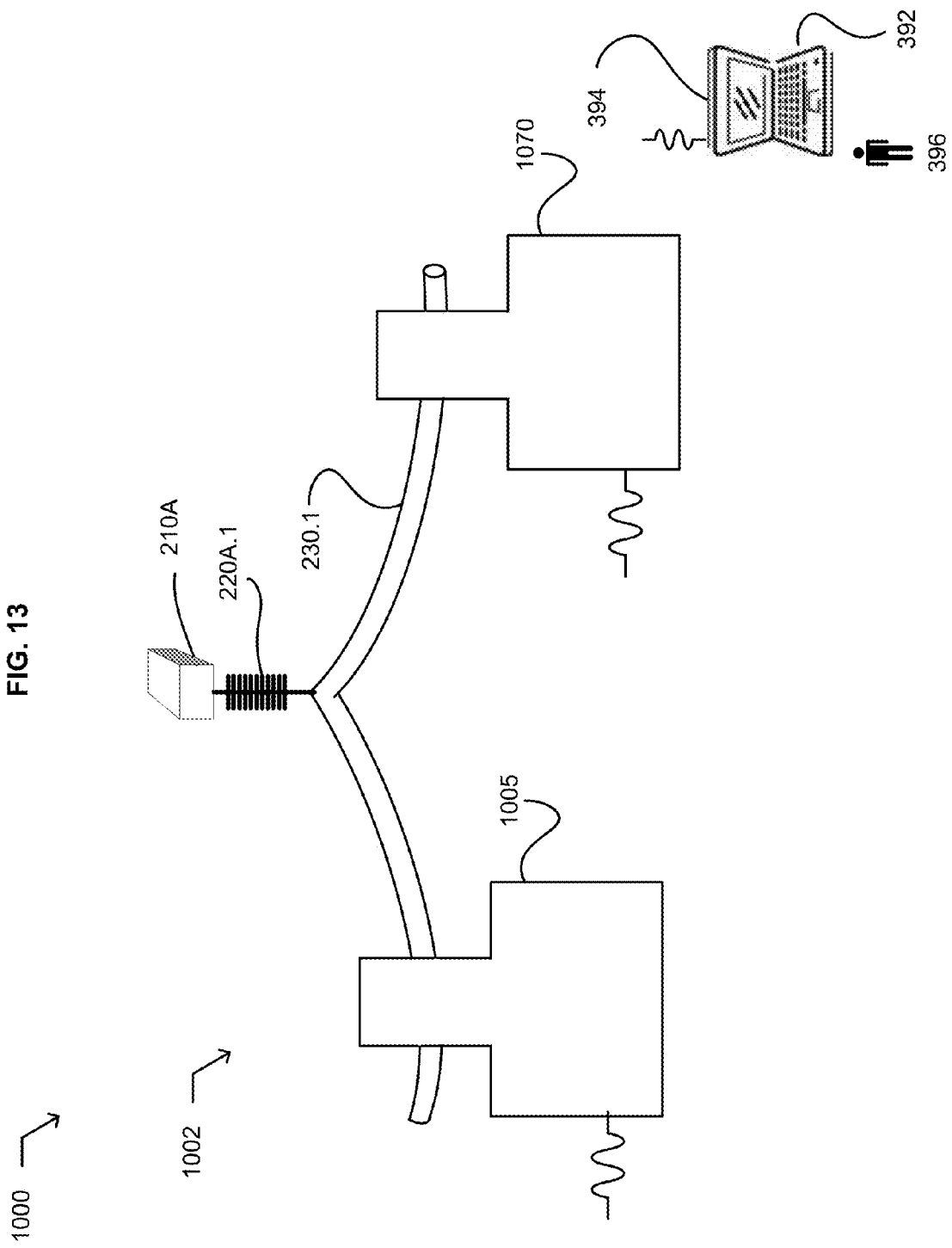
FIG. 13 illustrates an environment 1000 in which embodiments may be implemented.

FIG. 13 illustrates an environment 1000. The environment includes a power transmission system, illustrated by the portion of the tower 210A, the insulator 220A.1, and the transmission line 230.1 of the high-voltage power transmission system 205 described in conjunction with FIG. 3. The environment also includes a system 1002. The system includes at least two mobile devices, illustrated as a first mobile device 1005 and a second mobile device 1070. The at least two mobile devices are configured to (i) travel on or along a transmission line of the power transmission system, and the at least two mobile devices are further configured to (ii) cooperatively measure properties of the transmission line and/or other structures associated with the power transmission system.

In an embodiment, the power transmission system includes a high-voltage power transmission system. In an embodiment, the power transmission system includes a power distribution system.

Figure 14:
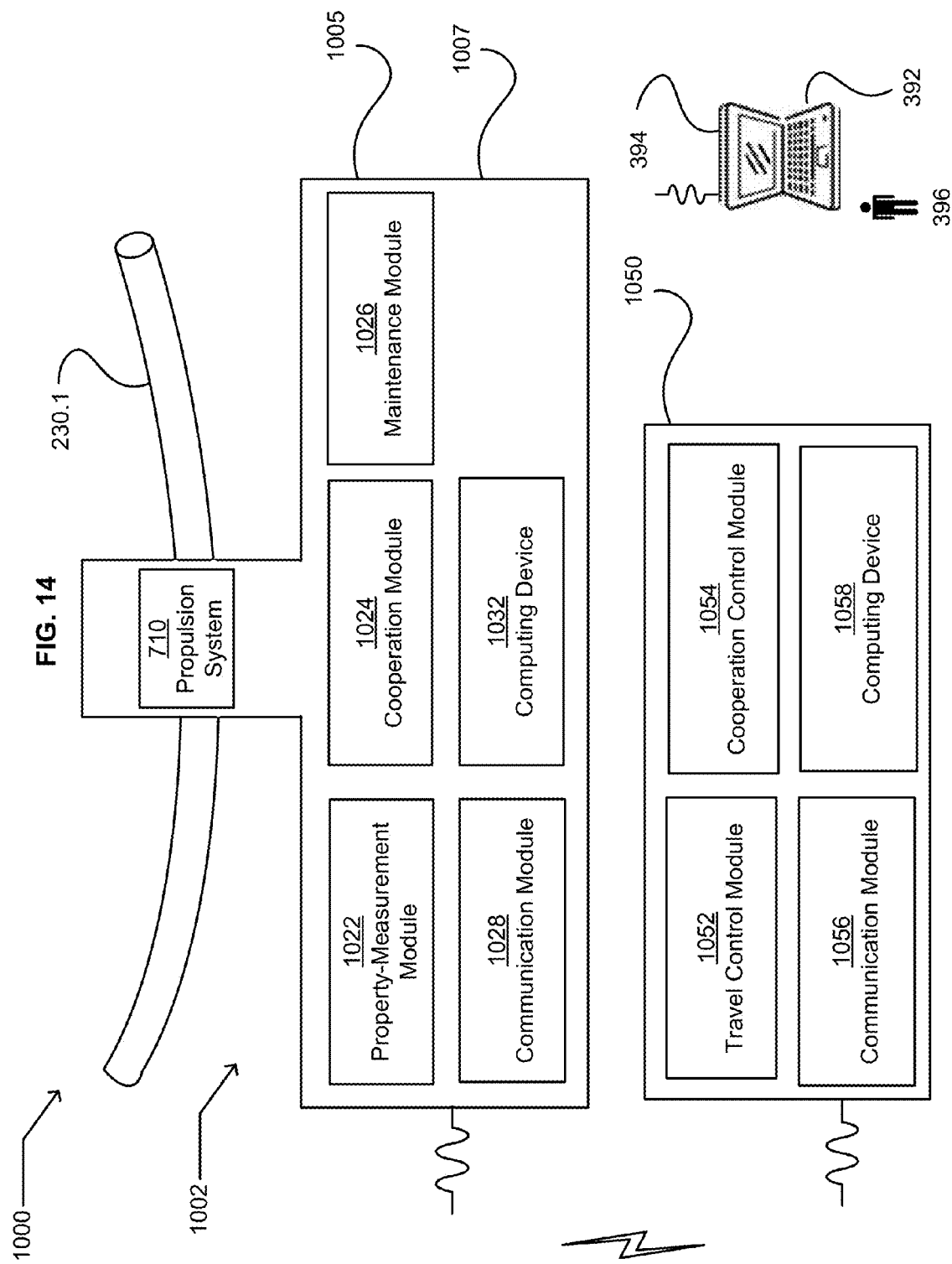
FIG. 14 illustrates an example embodiment of the mobile device 1005 of FIG. 13.

FIG. 14 illustrates an embodiment of the mobile device 1005 of FIG. 13. The mobile device includes a mobile chassis 1007 configured to travel on a transmission line of a power transmission system propelled by the propulsion system 710. The mobile device 1005 may include a property-measurement module 1022, a cooperation module 1024, a maintenance module 1026, or a communication module 1028. The property-measurement module is configured to measure in cooperation with the mobile device 1070 of FIG. 13 properties of the transmission line and/or other structures associated with the power transmission system. The cooperation module is configured facilitate cooperation with the mobile device 1070 in the measurement of the properties of the transmission line and/or other structures associated with the power transmission system. The communication module is configured to communicate with another mobile device of the at least two mobile devices, or a mobile robotic device management tool.

Those skilled in the art will recognize that in an embodiment aspects of the mobile device can be implemented using a hardware, software, and/or firmware implementation. Those skilled in the art will recognize that in an embodiment, aspects of the mobile device can be implemented, individually and/or collectively, by various types of electro-mechanical systems having a wide range of electrical components such as hardware, software, firmware, and/or virtually any combination thereof. Those skilled in the art will recognize that in an embodiment aspects of the mobile device can be implemented using a general purpose computer programmed to carry out or perform one or more particular functions of the mobile device. For example, aspects of the mobile device can be implemented using a computing device 1032. In an embodiment, the computing device may be implemented in part or whole using the general purpose thin computing device 20 described in conjunction with FIG. 1. In an embodiment, the computing device may be implemented in part or whole using the purpose computing device 100 described in conjunction with FIG. 2.

With reference to FIGS. 13-14, in an embodiment, the mobile device 1005 and the mobile device 1070 may be substantially similar. In an embodiment, one mobile device of the at least two mobile devices is a mobile robotic device. In an embodiment, two mobile devices of the at least two mobile devices are mobile robotic devices. In an embodiment, the power transmission system includes an overhead power transmission system. In an embodiment, the power transmission system includes an underground power transmission system. In an embodiment, the at least two mobile devices are further configured to automatically and cooperatively measure properties of the transmission line and/or other structures associated with the transmission line. In an embodiment, the at least two mobile devices are further configured to cooperatively measure electrical and/or mechanical properties of the transmission line and/or other structures associated with the transmission line. In an embodiment, the at least two mobile devices are further configured to cooperatively measure properties of a component of the power transmission system located between them. In an embodiment, the at least two mobile devices are further configured to automatically and cooperatively determine a voltage standoff-capability of an insulator supporting or holding the transmission line. For example, in an embodiment, the mobile device 1005 is configured to apply a test excitation to the transmission line and the mobile device 1070 is configured measure a response of the transmission line to the test excitation.

In an embodiment, the test excitation frequency is at about a nominal transmission line excitation frequency. In an embodiment, the test excitation frequency is different than a nominal transmission line excitation frequency. In an embodiment, the test excitation is applied to the live transmission line at about zero crossings in the excitation carried by the live transmission line. In an embodiment, the at about the zero crossings includes not more than plus or minus ten degrees of the zero crossings in the excitation carried by the live transmission line. In an embodiment, the at about the zero crossings includes not more than plus or minus five degrees of the zero crossings in the excitation carried by the live transmission line. In an embodiment, the at about the zero crossings includes not more than plus or minus two degrees of the zero crossings in the excitation carried by the live transmission line. In an embodiment, the at about the zero crossings includes not more than plus or minus one degree of the zero crossings in the excitation carried by the live transmission line.

In an embodiment, a mobile device is configured to apply a test excitation to the live transmission line during a select time portion of a frequency cycle of the excitation carried by the live transmission line. In an embodiment, a first mobile device is configured to apply a test excitation to an insulator supporting or holding the live transmission line and a second mobile device is configured measure a response of the insulator to the test excitation. In an embodiment, a first mobile device is configured to apply a test excitation to an insulator supporting or holding the power and a second mobile device is configured to counteract or offset the applied test excitation. In an embodiment, the at least two mobile devices are further configured to cooperatively measure properties of an insulator associated with an power transmission system, for example wherein the mobile device 1005 is positioned on the transmission line and on a first side of the insulator and the mobile device 1070 is positioned on the transmission line and at a second and opposing side of the insulator. FIG. 13 illustrates this embodiment. In an embodiment, a mobile device is configured to apply a test excitation to an insulator supporting or holding the transmission line at about zero crossings in the excitation carried by the transmission line. In an embodiment, a mobile device is configured to apply a test excitation to an insulator supporting or holding the transmission line during a select time portion of a frequency cycle of the excitation carried by the transmission line. In an embodiment, a mobile device is configured for passive or active electrical inspection of the transmission line and/or structures associated with the transmission line. In an embodiment, a mobile device is configured to measure physical transmission line parameters including one or more of temperature, cleanliness, stress/strain, and/or sag. In an embodiment, a mobile device includes at least a sensor configured to measure a height or extent of encroaching vegetation along the transmission line.

FIG. 14 illustrates an alternative embodiment of the environment 1000 that includes a system 1002. The system includes the at least mobile devices, which are illustrated as the first mobile device 1005 and the second mobile device 1070 of FIG. 13. The at least two mobile devices are configured to (i) travel on or along a transmission line of the power transmission system, and the at least two mobile devices are further configured to (ii) cooperatively measure properties of the transmission line and/or other structures associated with the power transmission system. The system includes a mobile device management tool 1050. The mobile device management tool is configured to control the traverse of the transmission line, for example, such as the transmission line 230.1 of the high-voltage power transmission system 205, by the at least two mobile devices.

In an embodiment, the power transmission system includes a high-voltage power transmission system. In an embodiment, the power transmission system includes a power distribution system.

In an embodiment, the mobile device management tool 1050 includes a travel control module 1052, a cooperation control module 1054, or a communication module 1056. The travel control module is configured to control the traverse of the transmission line by the at least two mobile devices. The cooperation control module is configured to control the cooperative measurement of the properties of the transmission line and/or other structures associated with the power transmission system by the at least two mobile devices. The communication module is configured to communicate with the at least two mobile devices, and/or a third-party device.

Those skilled in the art will recognize that in an embodiment aspects of the mobile device management tool can be implemented using a hardware, software, and/or firmware implementation. Those skilled in the art will recognize that in an embodiment, aspects of the mobile device management tool can be implemented, individually and/or collectively, by various types of electro-mechanical systems having a wide range of electrical components such as hardware, software, firmware, and/or virtually any combination thereof. Those skilled in the art will recognize that in an embodiment aspects of the mobile device management tool can be implemented using a general purpose computer programmed to carry out or perform one or more particular functions of the mobile device. For example, aspects of the mobile device management tool can be implemented using a computing device 1058. In an embodiment, the computing device may be implemented in part or whole using the general purpose thin computing device 20 described in conjunction with FIG. 1. In an embodiment, the computing device may be implemented in part or whole using the purpose computing device 100 described in conjunction with FIG. 2.

In an embodiment, the mobile device management tool is configured to control the traverse of the transmission line and facilitate the cooperative measurement by the at least two mobile devices. In an embodiment, the mobile device management tool is configured to schedule and control the traverse of the transmission line of the power transmission system by the at least two mobile devices. In an embodiment, the mobile device management tool is further configured to provide instructions to the at least two mobile devices regarding their cooperative measurement of properties. In an embodiment, the mobile device management tool is further configured to control an aspect of the cooperative measurement of properties by the at least two mobile devices. In an embodiment, the mobile device management tool is further configured to output informational data responsive to the cooperatively measured properties.

An embodiment includes method. After a start operation, an operational flow of the method includes initiating travel of a first mobile device over a transmission line of a power transmission system to a first location on the transmission line. For example, in an embodiment, this operation may be implemented using the travel control module 1052 described in conjunction with FIG. 14. The operational flow includes initiating travel of a second mobile device over the transmission line to a second location on the transmission line. For example, in an embodiment, this operation may also be implemented using the travel control module 1052 described in conjunction with FIG. 14. The operational flow includes measuring a property of a structure of the power transmission system using the first mobile device and the second mobile device. For example, in an embodiment, this operation may also be implemented using the property-measurement module 1022, the cooperation module 1024, and/or the cooperation control module 1054 described in conjunction with FIG. 14. The first mobile device and the second mobile device are configured to cooperatively measure the property of the structure. The operational flow includes outputting data indicative of the measured property of the structure. For example, in an embodiment, this operation may also be implemented using the communication module 1028, and/or the communication module 1056 described in conjunction with FIG. 14. The operational flow includes an end operation.

In an embodiment, the operational flow includes managing the cooperative measurement of the property of the power transmission system by the first mobile device and the second mobile device. In an embodiment, the transmission line includes a pre-selected first location on the transmission line. In an embodiment, the first location on the transmission line includes a first location on the transmission line selected by the first mobile device. In an embodiment, the second location on the transmission line includes a pre-selected second location on the transmission line. In an embodiment, the second location on the transmission line includes a second location on the transmission line selected by the second mobile device.

FIG. 15 illustrates an example environment 1200. The environment includes a power transmission system, illustrated by the transmission line 230.1 of the high-voltage power transmission system 205 described in conjunction with FIG. 3. The environment also includes a mobile device 1205. The mobile device includes a chassis 1207 configured to travel on a live transmission line, such as the transmission line 260A between two transmission towers, such as the towers 210*a* and 210B of the overhead high-voltage power transmission system described in conjunction with FIG. 3. The mobile device includes an assistance module 1222 physically associated with the chassis and configured to physically assist installation or de-installation of a conductor cable or line between the two transmission towers.

In an embodiment, the assistance module 1222 includes a pull-wire or pull-rope assistance module 1224 configured to deploy a pull-wire or pull-rope between the two transmission towers. In an embodiment, pull-wire or pull-rope assistance module is configured to deploy a pull-wire or pull-rope configured to facilitate installation of a new conductor cable or line between the two transmission towers. In an embodiment, the pull rope includes a low-mass, high-strength pull rope, e.g., Kevlar or Spectra. In an embodiment, pull-wire or pull-rope assistance module is configured to install a pull-wire or pull-rope between the two transmission towers. In an embodiment, pull-wire or pull-rope assistance module is configured to In an embodiment, the assistance module 1222 includes a support or spacing fixtures assistance module 1226 configured to physically facilitate installation of support or spacing fixtures for a new conductor cable or line. In an embodiment, the support or spacing fixtures assistance module is configured to install support or spacing fixtures for a new conductor cable or line. In an embodiment, the support or spacing fixtures assistance module is configured to physically facilitate installation of support or spacing fixtures at either of the two transmission towers or along the overhead transmission line on which it traverses. In an embodiment, the assistance module includes a pulling assistance module 1228 configured to apply a pulling force on a new conductor cable or line being installed. In an embodiment, the assistance module includes a de-installation assistance module 1232 configured to physically assist a de-installation of a conductor cable or line between the two transmission towers. In an embodiment, the assistance module includes a deployment assistance module 1234 configured to physically assist a de-installation of a conductor cable or line between the two transmission towers. In an embodiment, the assistance module includes a spool or reel 1236 configured to carry a new conductor cable or line. In an embodiment, the spool or reel is configured to carry and deploy a new conductor cable or line. In an embodiment, the assistance module includes a conductor removal module 1238 configured to gather removed conductor cable or line. In an embodiment, the mobile device includes a communication module 1244 physically associated with the chassis and configured for wireless communication.

Those skilled in the art will recognize that in an embodiment aspects of the mobile device 1205, including the assistance module 1222, can be implemented using a hardware, software, and/or firmware implementation. Those skilled in the art will recognize that in an embodiment, aspects of the mobile device can be implemented, individually and/or collectively, by various types of electro-mechanical systems having a wide range of electrical components such as hardware, software, firmware, and/or virtually any combination thereof. Those skilled in the art will recognize that in an embodiment aspects of the mobile device can be implemented using a general purpose computer programmed to carry out or perform one or more particular functions of the mobile device. For example, aspects of the mobile device can be implemented using a computing device 1246. In an embodiment, the computing device may be implemented in part or whole using the general purpose thin computing device 20 described in conjunction with FIG. 1. In an embodiment, the computing device may be implemented in part or whole using the purpose computing device 100 described in conjunction with FIG. 2.

FIG. 16 illustrates an example environment 1300. The environment includes a power transmission system, illustrated by the live transmission line 230.1 of the high-voltage power transmission system 205 described in conjunction with FIG. 3. The environment includes a system 1302. The system includes the mobile device 1205 described in conjunction with FIG. 15, and an installation-assistance controller 1350. The installation-assistance controller includes a travel control module 1352 configured to control travel by the mobile device over the live transmission line. The installation-assistance controller includes a physical-assistance control module 1354 configured to control provision of physical assistance by the mobile device. The installation-assistance controller includes a communication module 1356 configured to wirelessly communicate with the mobile device. In an embodiment, the travel control module 1352 is configured simultaneously control travel by at least two mobile devices on the live transmission line of the power transmission system.

In an embodiment, the power transmission system includes a high-voltage power transmission system. In an embodiment, the power transmission system includes a power distribution system.

Those skilled in the art will recognize that in an embodiment aspects of the installation-assistance controller can be implemented using a hardware, software, and/or firmware implementation. Those skilled in the art will recognize that in an embodiment, aspects of the installation-assistance controller can be implemented, individually and/or collectively, by various types of electro-mechanical systems having a wide range of electrical components such as hardware, software, firmware, and/or virtually any combination thereof. Those skilled in the art will recognize that in an embodiment aspects of the installation-assistance controller can be implemented using a general purpose computer programmed to carry out or perform one or more particular functions of the mobile device. For example, aspects of the installation-assistance controller can be implemented using a computing device 1358. In an embodiment, the computing device may be implemented in part or whole using the general purpose thin computing device 20 described in conjunction with FIG. 1. In an embodiment, the computing device may be implemented in part or whole using the purpose computing device 100 described in conjunction with FIG. 2.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1, A_2$, and C together, A, $B_1, B_2, C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A mobile robotic device comprising:
a mobile chassis configured to travel on a transmission line of a power transmission system;
an inspection module physically associated with the mobile chassis and configured to automatically inspect a structure associated with the power transmission system;
a risk-assessment module physically associated with the mobile chassis and configured to assess a potential risk to the power transmission system in response to inspection data provided by the inspection module;
a communication module physically associated with the mobile chassis and configured to output data indicative of the assessed potential risk; and
a maintenance module physically associated with the mobile chassis and configured to perform a maintenance, repair, or modification activity relative to the power transmission system in response to the assessed potential risk, the maintenance module being further configured to trim vegetation encroaching the structure associated with the power transmission system.

2. The mobile robotic device of claim 1, wherein the power transmission system includes a high-voltage power transmission system.

3. The mobile robotic device of claim 1, wherein the power transmission system includes a power distribution system.

4. The mobile robotic device of claim 1, wherein the transmission line is an overhead transmission line.

5. The mobile robotic device of claim 1, wherein the transmission line is a live transmission line.

6. The mobile robotic device of claim 1, wherein the inspection module is configured to automatically inspect for potential damage or deterioration to the structure.

7. The mobile robotic device of claim 1, wherein the inspection module is configured to automatically inspect the structure for a potential maintenance, repair, or modification need.

8. The mobile robotic device of claim 1, wherein the inspection module is configured to automatically inspect for encroaching vegetation.

9. The robotic mobile device of claim 1, wherein the structure includes at least one of the transmission line, other transmission lines, insulators, ground line, encasement, cooling system, or towers associated with the power transmission system.

10. The mobile robotic device of claim 1, wherein the risk-assessment module is configured to assess a potential risk to the power transmission system from normal wear and tear in response to data provided by the inspection module.

11. The mobile robotic device of claim 1, wherein the risk-assessment module is configured to assess a potential risk to the power transmission system from encroaching vegetation in response to data provided by the inspection module.

12. The mobile robotic device of claim 1, wherein the maintenance module is configured to automatically perform a maintenance, repair, or modification activity relative to the power transmission system.

13. The mobile robotic device of claim 1, wherein the maintenance module is configured to perform a maintenance, repair, or modification activity relative to the power transmission system in response to a received authorization.

14. The mobile robotic device of claim 1, wherein the maintenance module is configured to repair or clean a power line insulator.

15. The mobile robotic device of claim 1, wherein the maintenance module is configured to de-ice a transmission line.

16. A mobile robotic device comprising:
a mobile chassis configured to travel on a transmission line of an overhead power transmission system;
a vegetation inspection module physically associated with the mobile chassis and configured to measure a characteristic of vegetation growing proximate to a portion of the overhead power transmission system; and
a communication module physically associated with the mobile chassis and configured to output data indicative of the measured characteristic of the vegetation, the communication module being further configured to communicate with a maintenance module configured to trim vegetation.

17. The mobile robotic device of claim 16, wherein the vegetation inspection module includes a sensor configured to measure a height or extent of vegetation relative to the transmission line.

18. The mobile robotic device of claim 16, wherein the communication module is configured to wirelessly output data indicative of the measured characteristic of the vegetation.

19. A system, comprising:
a mobile device configured to travel on a transmission line of a power transmission system and measure one or more characteristics of vegetation encroaching the power transmission system; and
a vegetation management tool configured to address the measured one or more characteristics and assess risk to the power transmission system posed by the encroaching vegetation;
wherein the mobile device is further configured to trim the encroaching vegetation to address the assessed risk.

20. The system of claim 19, wherein the mobile device is configured to trim vegetation using electrical or photonic energy, chemical spray, and/or physical cutting.

21. The system of claim 19, wherein the vegetation management tool is configured to assess risk to the power transmission system posed by the encroaching vegetation at least partially based on generally available guidelines and/or protocols.

22. The system of claim 19, wherein the vegetation management tool is configured to use imaging, triangulation and/or time-of-flight measurement data to determine a height or extent of the encroaching vegetation.

23. The system of claim 19, wherein the vegetation management tool is configured to determine clearances between encroaching vegetation and the transmission line in response to the measured one or more characteristics of the encroaching vegetation.

24. The system of claim 19, wherein the vegetation management tool is configured to assess risk to the power transmission system from the encroaching vegetation based on one or more local geographic or topographic factors including whether the encroaching vegetation is above, below, or to the side of the power transmission system, and/or whether the encroaching vegetation is uphill or upwind from the power transmission system.

25. The system of claim 19, wherein the vegetation management tool is configured to address a measured clearance between the encroaching vegetation and the power transmission system, and to automatically assess risk to the transmission line posed by the encroaching vegetation based on the measured clearance.

26. A mobile robotic device comprising:
a mobile chassis configured to travel on a transmission line of an overhead power transmission system;
a vegetation inspection module physically associated with the mobile chassis and configured to measure a characteristic of vegetation growing proximate to a portion of the overhead power transmission system;
a communication module physically associated with the mobile chassis and configured to output data indicative of the measured characteristic of the vegetation; and
a maintenance module physically associated with the mobile chassis and configured to trim vegetation growing proximate to a portion of the overhead power transmission system.

27. The mobile robotic device of claim 26, wherein the maintenance module is configured to trim vegetation growing proximate to a portion of the overhead power transmission system in response to the outputted data indicative of the measured characteristic of the vegetation.

28. The mobile robotic device of claim 26, wherein the maintenance module is configured to automatically trim vegetation growing proximate to a portion of the overhead power transmission system.

29. The mobile robotic device of claim 26, wherein the maintenance module is configured to trim vegetation growing proximate to a portion of the overhead power transmission system in response to an instruction originated by a vegetation management tool.

30. A system, comprising:
a mobile device configured to travel on a transmission line of a power transmission system and measure one or more characteristics of vegetation encroaching the power transmission system; and a vegetation management tool configured to address the measured one or more characteristics and assess risk to the power transmission system posed by the encroaching vegetation;

wherein the vegetation management tool is configured to assess risk to the transmission line from the encroaching vegetation based on a time-lapse analysis of changes in the height or extent of the encroaching vegetation.

* * * * *